(12) United States Patent
Kwon et al.

(10) Patent No.: US 8,295,266 B2
(45) Date of Patent: Oct. 23, 2012

(54) METHOD FOR ADJUSTING RACH TRANSMISSION AGAINST FREQUENCY OFFSET

(75) Inventors: Yeong Hyeon Kwon, Gyeonggi-do (KR); Seung Hee Han, Gyeonggi-do (KR); Hyun Woo Lee, Gyeonggi-do (KR); Jin Sam Kwak, Gyeonggi-do (KR); Dong Cheol Kim, Gyeonggi-do (KR); Min Seok Noh, Gyeonggi-do (KR); Dragan Vujcic, Limours (FR)

(73) Assignee: LG Electronics Inc., Seoul (KR)

( * ) Notice: Subject to any disclaimer, the term of this patent is extended or adjusted under 35 U.S.C. 154(b) by 639 days.

(21) Appl. No.: 12/447,410

(22) PCT Filed: Oct. 25, 2007

(86) PCT No.: PCT/KR2007/005283
§ 371 (c)(1),
(2), (4) Date: Apr. 27, 2009

(87) PCT Pub. No.: WO2008/051033
PCT Pub. Date: May 2, 2008

(65) Prior Publication Data
US 2010/0054235 A1 Mar. 4, 2010

Related U.S. Application Data

(60) Provisional application No. 60/862,923, filed on Oct. 25, 2006, provisional application No. 60/863,782, filed on Oct. 31, 2006, provisional application No. 60/883,754, filed on Jan. 5, 2007, provisional application No. 60/884,398, filed on Jan. 10, 2007, provisional application No. 60/888,302, filed on Feb. 5, 2007, provisional application No. 60/896,824, filed on Mar. 23, 2007.

(30) Foreign Application Priority Data

| Dec. 4, 2006 | (KR) | 10-2006-0121516 |
| Feb. 5, 2007 | (KR) | 10-2007-0011534 |
| Feb. 5, 2007 | (KR) | 10-2007-0011772 |
| May 8, 2007 | (KR) | 10-2007-0044500 |
| Jun. 19, 2007 | (KR) | 10-2007-0059957 |

(51) Int. Cl.
*H04J 3/06* (2006.01)

(52) U.S. Cl. ........................................................ 370/350

(58) Field of Classification Search .................. 370/350
See application file for complete search history.

(56) References Cited

U.S. PATENT DOCUMENTS 6,442,220 B1 * 8/2002 Sihlbom ........................ 375/343
(Continued)

FOREIGN PATENT DOCUMENTS

EP 1505847 2/2005
(Continued)

OTHER PUBLICATIONS

3GPP TSG-RAN WG1 #46, Tallinn, Estonia, Aug. 28-Sep. 1, 2006, p. 1-9, Ranch in support of High-Speed UEs, Lucent Technologies.*
(Continued)

*Primary Examiner* — Anh-Vu Ly
*Assistant Examiner* — Maharishi Khirodhar
(74) *Attorney, Agent, or Firm* — Lee, Hong, Degerman, Kang & Waimey

(57) ABSTRACT

A method for establishing RACH transmission to prepare against the frequency offset is disclosed. The method reduces the length of the RACH preamble even if the frequency offset exists, allows the RACH preamble to include a repeated structure (also called an iterative structure) or to use a specific sequence with less affect on the frequency offset, so that the Node-B can easily detect the RACH preamble. If different conditions are established in a high-speed UE and a low-speed UE, an amount of system overheads can be reduced as compared to another case in which an overall RACH condition has been prescribed for only the high-speed UE irrespective of the low-speed UE. And, the method determines whether the user equipment (UE) can estimate its speed according to the aforementioned RACH setup condition, and prescribes a detailed RACH access method according to the determined result.

10 Claims, 16 Drawing Sheets

U.S. PATENT DOCUMENTS

| | | |
|---|---|---|
| 7,072,462 B2 | 7/2006 | Smith et al. |
| 7,881,364 B2 | 2/2011 | Noh et al. |
| 8,098,745 B2 | 1/2012 | Bertrand et al. |
| 8,144,746 B2 | 3/2012 | Iwai et al. |
| 8,218,496 B2 | 7/2012 | Bertrand et al. |
| 2005/0164708 A1* | 7/2005 | Gabriel et al. ............. 455/452.2 |
| 2005/0232158 A1* | 10/2005 | Hondo ......................... 370/241 |
| 2005/0286409 A1 | 12/2005 | Yoon et al. |
| 2007/0165567 A1 | 7/2007 | Tan et al. |
| 2007/0211671 A1 | 9/2007 | Cha |
| 2008/0101306 A1 | 5/2008 | Bertrand et al. |
| 2008/0162903 A1 | 7/2008 | Yamazaki |
| 2008/0235314 A1 | 9/2008 | Lee et al. |
| 2008/0316961 A1 | 12/2008 | Bertrand et al. |
| 2009/0073944 A1 | 3/2009 | Jiang et al. |
| 2009/0116459 A1 | 5/2009 | Do |
| 2009/0203384 A1 | 8/2009 | Vujcic |
| 2009/0225701 A1 | 9/2009 | Kwon et al. |
| 2009/0290662 A1 | 11/2009 | Han et al. |
| 2009/0305693 A1 | 12/2009 | Shimomura et al. |
| 2010/0002804 A1 | 1/2010 | Ogawa et al. |
| 2010/0039997 A1 | 2/2010 | Ratasuk et al. |
| 2010/0067461 A1 | 3/2010 | Kwak et al. |
| 2010/0067591 A1 | 3/2010 | Luo et al. |
| 2010/0074130 A1 | 3/2010 | Bertrand et al. |
| 2010/0105405 A1 | 4/2010 | Vujcic |
| 2010/0220664 A1 | 9/2010 | Hooli et al. |
| 2010/0226413 A1 | 9/2010 | Muharemovic et al. |
| 2011/0007825 A1 | 1/2011 | Hao et al. |
| 2011/0014909 A1 | 1/2011 | Han et al. |
| 2011/0032926 A1 | 2/2011 | Xia et al. |
| 2011/0086658 A1 | 4/2011 | Baldemair |
| 2011/0176406 A1 | 7/2011 | Mauritz |
| 2011/0200002 A1 | 8/2011 | Han et al. |
| 2011/0212745 A1 | 9/2011 | Papasakellariou |
| 2012/0026952 A1 | 2/2012 | Okubo et al. |
| 2012/0051292 A1 | 3/2012 | Mauritz |

FOREIGN PATENT DOCUMENTS

| | | |
|---|---|---|
| KR | 1020070102121 | 10/2007 |
| KR | 1020080015355 | 2/2008 |
| WO | 00/76248 | 12/2000 |
| WO | 0076248 | 12/2000 |
| WO | WO 0076248 A1 * | 12/2000 |
| WO | 03/019808 | 3/2003 |
| WO | 2008/081311 | 7/2008 |

OTHER PUBLICATIONS

Lucent Technologies, "RACH in Support of High-Speed UEs," R1-062387, 3GPP TSG-RAN WG1 #46, Aug. 2006, XP-050102905.

LG Electronics, Inc., "RACH Design Under Frequency Offset", 3GPP TSG-RAN WG1, R1-063162, Nov. 6, 2006.

Texas Instruments, "Configurable Cyclic Shift for Non Synchronized Random Access Preamble", 3GPP TSG-RAN WG1, R1-062631, Oct. 9, 2006.

Texas Instruments, "Non Synchronized Random Access Design for High Doppler Conditions", 3GPP TSG-RAN WG1, R1-063214, Nov. 6, 2006.

LG Electronics, Inc., "Comparison of Formula for Restricted Cyclic Shift Set", 3GPP TSG-RAN WG1, R1-073060, Jun. 25, 2007.

LG Electronics, Inc., "Formula for Restricted Cyclic Shift Set", 3GPP TSG-RAN WG1, R1-072331, May 7, 2007.

Nokia, "Restricted Sets of RACH Preamble Signatures for Environments With High Doppler Shifts", 3GPP TSG-RAN WG1, R1-070377, Jan. 15, 2007.

LG Electronics, Inc., "Ways to Mitigate Frequency Offset With CAZAC Cyclic Shift", 3GPP TSG-RAN WG1, R1-070227, Jan. 15, 2007.

* cited by examiner

METHOD FOR ADJUSTING RACH TRANSMISSION AGAINST FREQUENCY OFFSET

CROSS-REFERENCE TO RELATED APPLICATIONS

This application is the National Stage filing under 35 U.S.C. §371 of International Application No. PCT/KR2007/005283, filed on Oct. 25, 2007, which claims the benefit of earlier filing date and right of priority to Korean Application Nos. 10-2006-0121516, filed on Dec. 4, 2006, 10-2007-0011534, filed on Feb. 5, 2007, 10-2007-0011772, filed on Feb. 5, 2007, 10-2007-0044500, filed on May 8, 2007, and 10-2007-0059957, filed on Jun. 19, 2007, and also claims the benefit of U.S. Provisional Application Ser. Nos. 60/862,923, filed on Oct. 25, 2006, 60/863,782, filed on Oct. 31, 2006, 60/883,754, filed on Jan. 5, 2007, 60/884,398, filed on Jan. 10, 2007, 60/888,302, filed on Feb. 5, 2007, and 60/896,824, filed on Mar. 23, 2007.

TECHNICAL FIELD

The present invention relates to a wireless communication technology, and more particularly to a RACH setup method for preparing for a frequency offset and/or reducing frequency errors and timing errors in a large-sized cell, and a RACH transmission method using the same.

BACKGROUND ART

RACH is a channel for acquiring initial uplink synchronization. If a terminal (i.e., UE) is firstly powered on, or the terminal (UE) is switched to an active status after it has been in an idle mode for a long period of time, uplink synchronization should be re-established. The RACH is generally adapted to re-establish the uplink synchronization, and need not establish time synchronization or frequency synchronization.

The RACH basically supports a plurality of users (hereinafter referred to as a multi-user). Each user equipment (UE) transmits a specific preamble sequence when accessing the RACH.

If a base station (hereinafter referred to as a Node-B) recognizes the preamble sequence and transmits the recognized preamble sequence, the user equipment (UE) updates its own time synchronization information using the aforementioned preamble sequence information. In this case, if the Node-B transmits frequency synchronization information along with the time synchronization information, this frequency synchronization information can also be used to correct the user equipment (UE).

FIG. 1 is a basic RACH structure based on the presence or absence of a cyclic prefix (CP).

Referring to FIG. 1, the RACH can be classified into two RACH types 101 and 102. The first RACH 101 uses the cyclic prefix (CP), and the second RACH 102 does not use the cyclic prefix (CP).

If the CP is applied to the RACH as shown in the first RACH 101, it can maintain the orthogonality between channels by reducing interference between channels, however it slightly reduces the sequence length. If the sequence length becomes shorter, correlation characteristics become deteriorated, so that it may have a negative influence upon the detection performance.

In other words, if the RACH does not use the CP as shown in the second RACH 102, the preamble length becomes longer, but orthogonality between sequences cannot be maintained when the second RACH 102 searches for the preamble in the frequency area.

In the meantime, since the RACH preamble is a signal transmitted before a closed loop between the UE and the Node-B is not formed, the RACH preamble is generated by the user equipment (UE) and is then transmitted, so that it is vulnerable to the frequency offset. If the Node-B receives the RACH affected by the aforementioned frequency offset, a false alarm rate of the Node-B may increase in the Node-B or the detection probability may be decreased in the same Node-B.

Therefore, in order to cope with the negative influence of the frequency offset in the RACH transmission, many developers are conducting intensive research into a method for establishing the RACH to cope with the frequency offset and a method for allowing the user equipment (UE) to transmit the RACH according to the aforementioned RACH setup information.

Presently, according to the 3GPP LTE, the RACH needs to be operated in a large-sized cell without any problem, so that an improved RACH structure for satisfying this requirement must be designed.

DISCLOSURE

Technical Problem

Accordingly, the present invention is directed to a method for adjusting RACH transmission against a frequency offset that substantially obviates one or more problems due to limitations and disadvantages of the related art.

An object of the present invention is to provide a RACH transmission construction method for reducing a Node-B's false alarm rate caused by the frequency offset during the RACH transmission, providing a RACH transmission setup method of a user equipment (UE) so as to increase the RACH detection probability, and determining whether the user equipment (UE) can estimate its speed.

Another object of the present invention is to provide a RACH structure for allowing the RACH to be normally operated in a large-sized cell.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, a method for setting RACH transmission of a user equipment (UE) to prepare against a frequency offset comprising: setting a first RACH setup condition for a high-speed UE and a second RACH setup condition for a low-speed UE; and transmitting information about at least one of the first RACH setup condition for the high-speed UE and the second RACH setup condition for the low-speed UE to a downlink.

Preferably, the first RACH setup condition for the high-speed UE and the second RACH setup condition for the low-speed UE include at least one of a condition for RACH structures for use each of in the high-speed UE and the low-speed UE, a condition for preamble structures applied to each of the high-speed UE and the low-speed UE in the same RACH structure, and a condition for sequence sets for each of the high-speed UE and the low-speed UE.

Preferably, if the condition for the RACH structures of the high-speed UE and the low-speed UE is set, the condition for the RACH-structures is set by at least one of a first scheme in which a length of the RACH of the high-speed UE is shorter than that of the RACH of the low-speed UE, and a second scheme in which a preamble of the RACH of the high-speed UE has a repeated structure.

Preferably, the method further comprises: determining, by a Node-B, a frequency offset situation within a cell, and setting each number of the high-speed UE's RACH and the low-speed UE's RACH in a RACH resource region.

Preferably, if the condition for preamble structures applied to the high-speed UE and the low-speed UE in the same RACH structure is set, the high-speed UE's preamble structure is set by a scheme for repeatedly applying the preamble, and the low-speed UE's preamble structure is set by either a scheme employing a preamble without any repetition, or another scheme employing a long preamble having the length equal to the repeated length of the high-speed UE's preamble.

Preferably, if the condition for sequence sets of the high-speed UE and the low-speed UE is set, the sequence set for each of the high-speed UE and the low-speed UE is set to the set of CAZAC sequences, and the sequence set for the high-speed UE is set to a ZCZ-sequence set in which a CAZAC index is within an initial predetermined range or within a last predetermined range.

Preferably, if a condition for sequence sets for the high-speed UE and the low-speed UE is set, the sequence set for each of the high-speed UE and the low-speed UE is set to a new CAZAC sequence, and the sequence set for the high-speed UE does not includes a ZCZ sequence.

Preferably, the sequence set for the low-speed UE is a sequence set in which the sequence set of the high-speed UE is excluded from a total RACH sequence set.

Preferably, the sequence set of the low-speed UE is different from that of the high-speed UE.

In another aspect of the present invention, there is provided a method for allocating a sequence in a cellular mobile communication system including several cells, the method comprising: acquiring information of a cell in which a frequency offset is equal to or higher than a predetermined level; and allocating a sequence to the cell having the frequency offset which is equal to or higher than the predetermined level, wherein in the allocating the sequence, a sequence having no circular shift (CS) is allocated to the cell having the frequency offset which is equal to or higher than the predetermined level, or if the sequence having a circular shift (CS) is allocated to the cell, a sequence whose sequence index is within a predetermined range is allocated to the cell.

Preferably, the sequence index within the predetermined range is a index within an initial predetermined range of a entire sequence index or within a last predetermined range of the entire sequence index.

Preferably, the method further comprises: acquiring information of a cell having a frequency offset less than the predetermined level; and allocating a sequence, which has not been allocated to the cell having the frequency offset equal to or higher than the predetermined level, to the cell having the frequency offset less than the predetermined level.

Preferably, the cell having the frequency offset equal to or higher than the predetermined level has a equal or higher probability of existence of a high-speed UE than a predetermined probability.

In still another aspect of the present invention, there is provided a RACH transmission method comprising: receiving a signaling message from a Node-B to select at least one of predetermined RACH structures; and transmitting a RACH signal having a RACH structure selected according to the signaling message.

In still another aspect of the present invention, there is provided a method for repeating a sequence for transmitting a channel signal, the method comprising: a) repeating a predetermined sequence at least two times; b) dividing individual repetition parts of the sequence, which has been repeated at least two times, into at least two parts and ordering each of the divided parts individually in each of the repetition parts; and c) sequentially arranging the same-ordered parts from among the at least two parts of the repetition parts in the sequence having been repeated at least two times, so that the same-ordered parts are arranged in succession.

Preferably, if the predetermined sequence is repeated two times in the repeating step a), and each repetition part of the twice-repeated sequence is divided into a first part and a second part in the dividing step b), in the arranging step c), the first parts of the individual repetition parts in the twice-repeated sequence are sequentially arranged, and the second parts of the individual repetition parts are then sequentially arranged in the rear of the first parts.

Preferably, the method further comprises: before entering the dividing step d) after the repeating step a), applying a circular shift (CS) to at least one repetition part of the at least two times repeated sequence.

Preferably, the method further comprises: masking each repetition part of the sequence repeated at least two times using a sequence having a length corresponding to a number of repetitions of at least two times.

In still another aspect of the present invention, there is provided a RACH transmission method comprising: a) acquiring uplink information including at least one of a first RACH setup condition for a high-speed UE and a second RACH setup condition for a low-speed UE; b) selecting either one of the first RACH setup condition for the high-speed UE and the second RACH setup condition for the low-speed UE, with a first selection probability to the first RACH setup condition and a second selection probability to the second RACH setup condition; c) firstly transmitting a RACH signal according to the selected RACH setup condition; and d) if the first transmission of the RACH signal fails, repeating the selecting step b) of the RACH setup condition, and secondly transmitting the RACH signal, wherein if the failure is caused by no response, the first selection probability in the secondly-transmitting step d) is set to be higher than the first selection probability in the firstly-transmitting step c), and the second selection probability in the secondly-transmitting step d) is set to be lower than the other second selection probability in the firstly-transmitting step c).

Preferably, the method further comprises: if the failure is acknowledged by reception of a NACK signal, the first selection probability and the second selection probability in the secondly-transmitting step d) are equal to those of the firstly-transmitting step c).

It is to be understood that both the foregoing general description and the following detailed description of the present invention are exemplary and explanatory and are intended to provide further explanation of the invention as claimed.

Advantageous Effects

The RACH setup method according to the present invention reduces the length of the RACH preamble even if the frequency offset exists, allows the RACH preamble to include a repeated structure (also called an iterative structure) or to use a specific sequence with less affect on the frequency offset, so that the Node-B can easily detect the RACH preamble. If different conditions are established in a high-speed UE and a low-speed UE, an amount of system overheads can be reduced as compared to another case in which an overall RACH condition has been prescribed for only the high-speed UE irrespective of the low-speed UE.

The present invention determines whether the user equipment (UE) can estimate its speed according to the aforementioned RACH setup condition, and prescribes a detailed RACH access method according to the determined result, so that it can transmit the RACH to decrease the influence of the frequency offset although the user equipment (UE) is unable to recognize its own speed.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
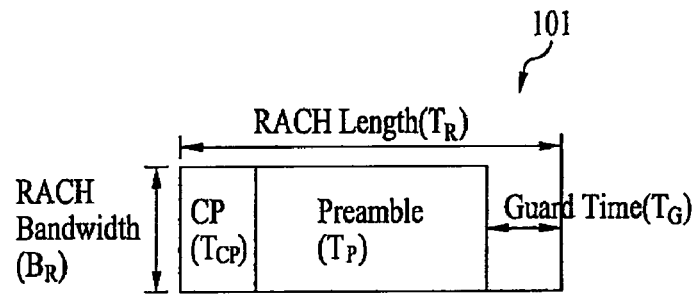
FIG. 1 is a basic structural diagram illustrating a RACH based on the presence or absence of a cyclic prefix (CP)
Figure 1:
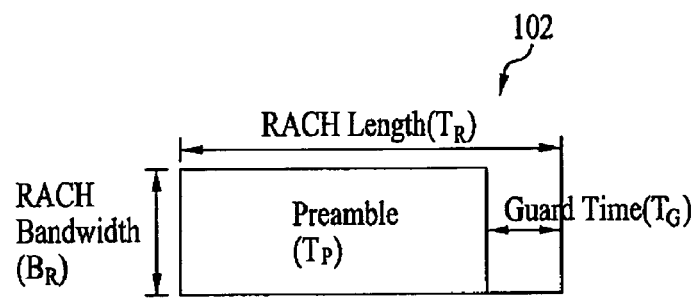

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

For the convenience of description and better understanding of the present invention, general structures and devices well known in the art will be omitted or be denoted by a block diagram or a flow chart. Wherever possible, the same reference numbers will be used throughout the drawings to refer to the same or like parts.

The frequency offset greatly affects the detection throughput of the receiver. Specifically, the frequency offset greatly deteriorates the detection throughput of a frequency-area detector.

For example, in the case of using a frequency-area detector, the 1 ms RACH having a preamble length of 0.8 ms has difficulty in discriminating the ZCZ sequence under the condition that the frequency offset reaches 625 MHz.

Although the oscillator accuracy has been correctly established in a target sub-carrier frequency, a Doppler frequency may encounter serious throughput deterioration in the frequency-area detector.

The frequency-area detector has a detection complexity lower than that of a time-area detector. It is preferable that the above-mentioned frequency-area detector may be used to reduce the RACH detection complexity.

One embodiment of the present invention provides a method for solving the problem encountered when the preamble transmitted to the RACH is wrongly detected due to the frequency offset.

In more detail, the present invention provides a method for solving the problem encountered when the aforementioned frequency-area detector incorrectly detects the preamble transmitted to the RACH due to the frequency offset.

If an initial UE approaches the RACH, it transmits a signal under the condition that no time/frequency synchronization has been established with the uplink, so that the Node-B receiving the RACH preamble must undergo the detection throughput deterioration due to the frequency offset.

In order to solve the above-mentioned problems, a variety of methods can be used, for example, a first method for establishing conditions of the overall RACH to the high-speed UE having a relatively-high frequency offset, and a second method for establishing different RACH transmission conditions in the high-speed UE and the low-speed UE.

Exemplary methods of the first method are a method for adjusting the RACH length, a method for adjusting an available sequence, and a method for allocating the repeated structure to the preamble.

The second method for establishing different RACH transmission conditions for the high-speed UE and the low-speed UE establishes specific conditions for the high-speed UE to prepare for the throughput deterioration caused by the frequency offset, instead of establishing the same RACH transmission conditions in all the UEs. For example, a variety of methods can be used as the above-mentioned second method, for example, a method for establishing different RACH structures in the high-speed UE and the low-speed UE, a method for establishing different preamble structures in the high-speed UE and the low-speed UE, and a method for defining different sequence sets for the high-speed UE and the low-speed UE and allocating the defined sequence sets to the high-speed UE and the low-speed UE, etc.

According to the method for establishing different RACH transmission conditions in the high-speed UE and the low-speed UE, the RACH access method of the UE may be differently established according to specific information indicating whether the UE can estimate its own speed.

One embodiment of the present invention provides a method for pre-considering a variety of RACH setup conditions, so that it establishes only the RACH based on either one of the aforementioned conditions or establishes the RACH based on some or all of the aforementioned conditions, thereby informing each UE of the established result over a BCH channel.

Detailed descriptions of the above-mentioned methods will hereinafter be described.

Firstly, the method for adjusting the RACH length will hereinafter be described.

The reason why the frequency offset encounters serious problems in the RACH is an excessively-long RACH length. If the unit is very small in size as in the OFDM-symbol length, the frequency offset caused by the transmission/reception operation has no problem in the OFDM symbol. However, the RACH has a relatively-long length longer than that of the OFDM symbol in time, so that it is greatly affected by even a slight- or low-frequency offset. Presently, the RACH length discussed in the 3GPP LTE is set to 1 ms.

Figure 2:
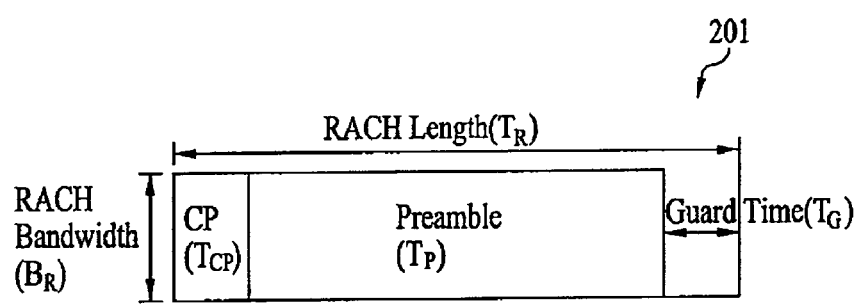
FIG. 2 is a conceptual diagram illustrating a method for reducing the RACH length according to one embodiment of the present invention.
Figure 2:
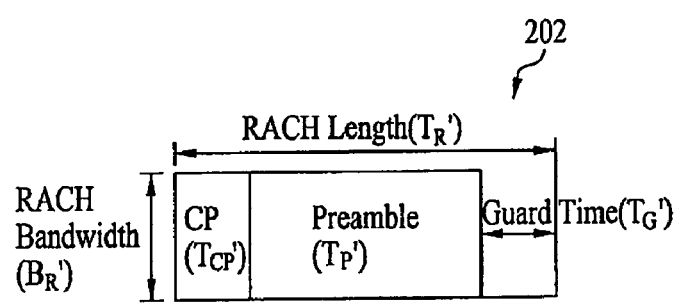

FIG. 2 is a conceptual diagram illustrating a method for reducing the RACH length according to one embodiment of the present invention.

The frequency offset endurable by the preamble of the conventional RACH 201 is much less than an inverse number ($1/T_p$) of the RACH-preamble length. The method according to one embodiment of the present invention is to reduce the RACH length.

FIG. 2 shows a method for reducing the RACH 201's length $T_R$ to the length $T_R'$ so as to implement the other RACH 202. If the RACH length is shortened as shown in the RACH 202 of FIG. 2, the frequency offset endurable by the preamble increases from $1/T_P$ to $1/T_{P'}$ (where, $T_{P'}<T_P$), so that the probability of generating the detection error in the Node-B decreases. In this case, the decreased RACH length may be decided to maintain the detection probability required for the system in consideration of the influence of the frequency offset.

Presently, the 3GPP LTE are discussing the method for employing the RACH having the length of 0.5 ms under the condition that RACH is greatly affected by the frequency offset. In this way, in the case of using the RACH having the length of 0.5 ms, the detection throughput deterioration caused by the frequency offset can be solved, so that the user equipment (UE) can support the speed of up to 500 km/h.

In more detail, in the case of using the RACH of the length 0.5 ms, the preamble length is set to 0.4 ms, the CP length and the guard time are set to 50 μs.

In this way, if it is assumed that a Node-B oscillator deviation of 0.05 ppm and a UE oscillator deviation of 0.1 ppm exist under the condition that the RACH has the preamble of the length 0.4 ms, the half of sub-carrier space is 1250 Hz, and so that the UE speed of about 500 Km/h can be supported.

If it is assumed that maximum throughput deterioration occurs in the aforementioned half of sub-carrier space, and the RACH of 0.5 ms is used as described above, it can be recognized that the throughput can be sufficiently acquired.

In the meantime, if the oscillator throughput is poor, the throughput deterioration caused by the frequency offset becomes more serious.

Figure 3:
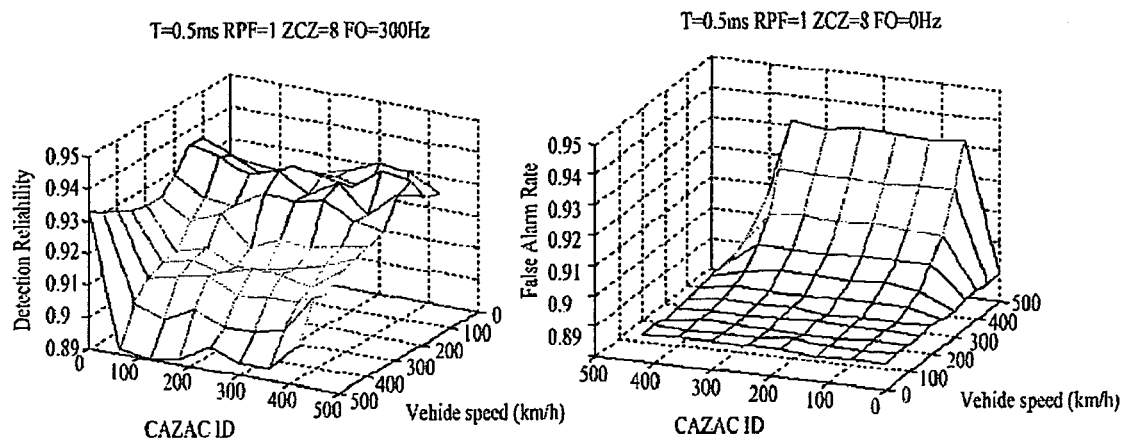
FIGS. 3 and 4 are graphs illustrating the RACH of a short length, and shows detection throughputs and false alarm rates of individual conditions in the case of using the RACH of 0.5 ms according to the present invention.
Figure 4:
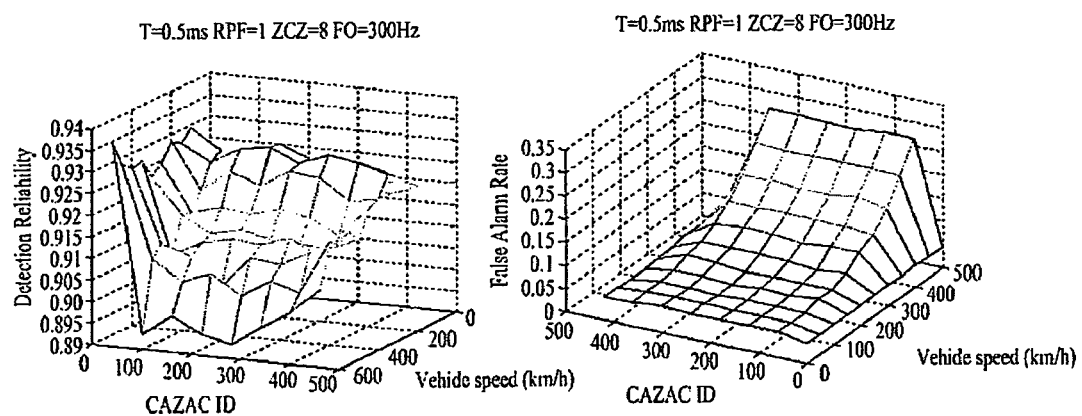

FIGS. 3 and 4 are graphs illustrating the RACH of a short length, and shows detection throughputs and false alarm rates of individual conditions in the case of using the RACH of 0.5 ms according to the present invention.

In more detail, provided that a CAZAC sequence is used as a sequence, and the frequency-area detector is employed in a typical urban (TU) channel having the Ep/No (i.e., the ratio of a pilot signal to noise) of 18 dB, the detection throughput under a frequency offset 0 Hz is depicted in the left side of FIG. 3, and the false alarm rate under the same frequency offset 0 Hz is depicted in the right side of FIG. 3. Provided that a CAZAC sequence is used as a sequence, and the frequency-area detector is employed in a typical urban (TU) channel having the Ep/No (i.e., the ratio of a pilot signal to noise) of 18 dB, the detection throughput under a frequency offset 300 Hz is depicted in the left side of FIG. 4, and the false alarm rate under the same frequency offset 300 Hz is depicted in the right side of FIG. 4. One axis in the plane direction of each graph is indicative of an index of the CAZAC sequence, and the other axis is indicative of the UE speed.

As can be seen from FIG. 3, in the case of using the RACH of 0.5 ms, it can be recognized that the detection throughput of the high-speed UE is deteriorated in some parts of the CAZAC index.

Although the above-mentioned detection throughput deterioration is not high, the false alarm rate is relatively high, so that the processing time and resources of the Node-B may be unexpectedly wasted.

FIG. 4 shows the detection throughput and the false alarm rate in the case of the frequency offset of 300 Hz, so that it can be recognized that there is little difference in throughput between FIG. 3 and FIG. 4.

Figure 5:
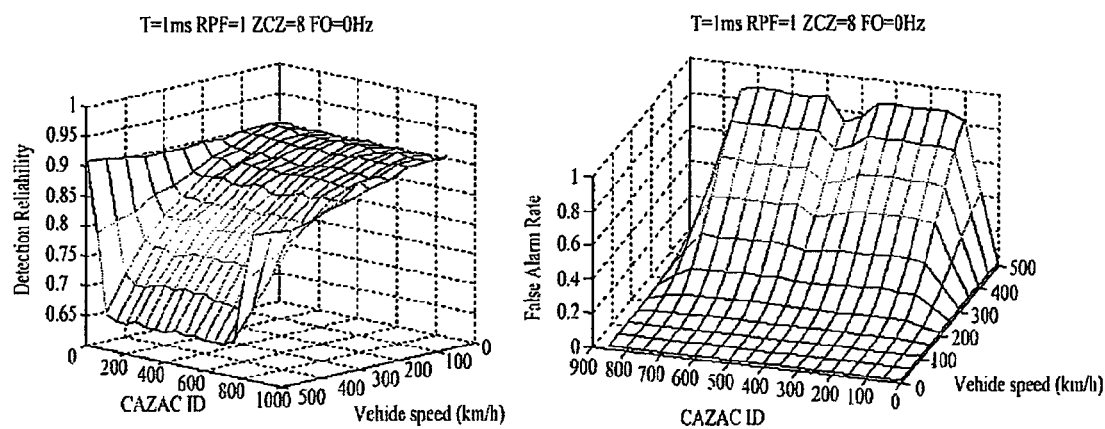
FIGS. 5 and 6 are graphs illustrating detection throughputs and false alarm rates of individual conditions in the case of using the RACH of 1 ms according to the present invention.
Figure 6:
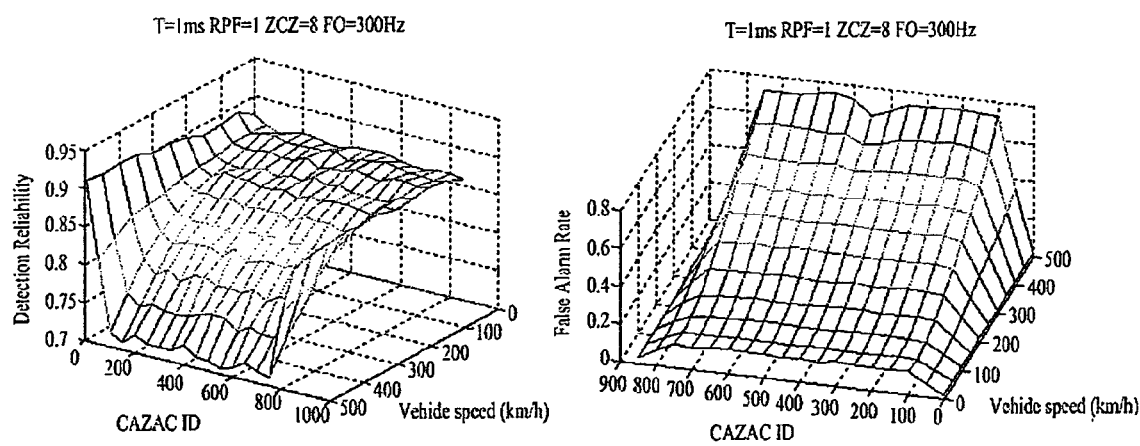

FIGS. 5 and 6 are graphs illustrating detection throughputs and false alarm rates of individual conditions in the case of using the RACH of 1 ms according to the present invention.

In more detail, provided that the CAZAC sequence is used as a sequence in the same manner as in FIGS. 3 and 4, and the frequency-area detector is employed in the typical urban (TU) channel having the Ep/No of 18 dB, the detection throughput under a frequency offset 0 Hz is depicted in the left side of FIG. 4, and the false alarm rate under the same frequency offset 0 Hz is depicted in the right side of FIG. 4. Provided that the CAZAC sequence is used as a sequence, and the frequency-area detector is employed in the typical urban (TU) channel having the Ep/No of 18 dB, the detection throughput under a frequency offset 300 Hz is depicted in the left side of FIG. 6, and the false alarm rate under the same frequency offset 300 Hz is depicted in the right side of FIG. 6. One axis of each graph in FIGS. 5 and 6 is indicative of an index of the CAZAC sequence, and the other axis is indicative of the UE speed, in the same manner as in FIGS. 3 and 4.

Provided that the results of FIGS. 5 and 6 are compared with those of FIGS. 3 and 4, and the RACH of 1 ms is used, it can be recognized that the detection throughput and the false alarm rate of the 1 ms RACH are inferior to those of the 0.5 ms RACH.

As shown in the detection throughput graphs and the false alarm rate graphs of FIGS. 5 and 6, it can be easily recognized that the throughput deterioration of some CAZAC sequences is relatively less than those of other CAZAC sequences. The above-mentioned CAZAC index selection scheme will hereinafter be described in detail.

If the RACH length is set to a short length as shown in FIGS. 3 to 6, the system can be more resistant to the frequency offset.

However, in the case of simply reducing the RACH length as shown in FIG. 2, the number of available sequences is reduced, and the spreading gain is also reduced.

In order to solve the above problems, another embodiment of the present invention provides a method for allowing the RACH preamble to include the repeated structure when the RACH is designed/allocated.

Figure 7:
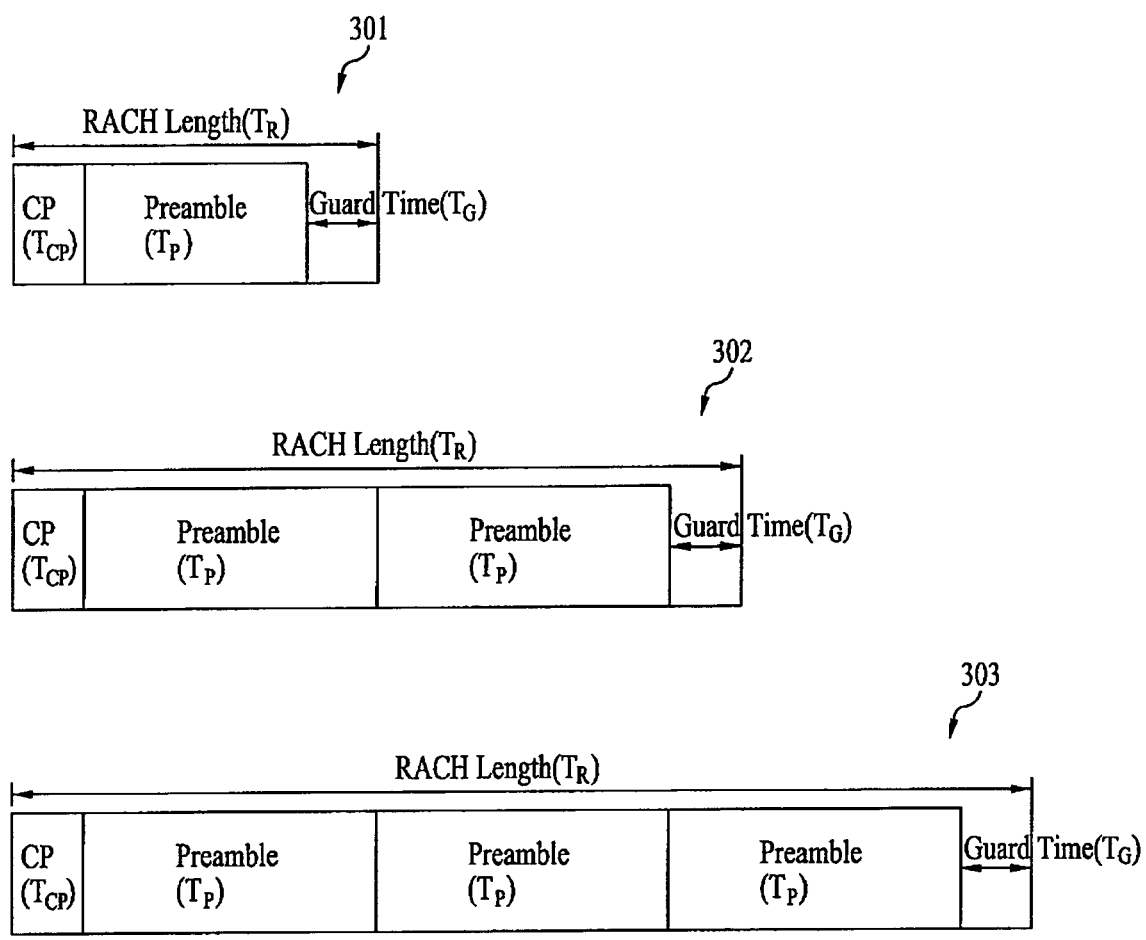
FIG. 7 shows advantages of a method for establishing a repeated structure of the RACH preamble according to one embodiment of the present invention.

FIG. 7 shows advantages of a method for establishing a repeated structure of the RACH preamble according to one embodiment of the present invention.

In the case of reducing the RACH length to increase the frequency offset level endurable by the RACH preamble as shown in the RACH 301, the number of available sequences is gradually reduced as the length of a sequence to be applied to the preamble is gradually reduced.

In more detail, the RACH 301 exemplarily shows the total RACH length ($T_R$) of 0.5 ms. This RACH 301 has the CP of 0.1 ms ($T_{CP}$=0.1 ms) and a guard time of 0.1 ms ($T_G$=0.1 ms), so that the coverage of about 15 Km can be provided.

In the meantime, the RACH 302 according to another embodiment of the present invention maintains the RACH length ($T_R$) of 1 ms, and at the same time includes the preamble-repeated structure. It can be recognized that the basic unit length of the preamble having the repeated structure is set to 0.4 ms longer than that of the RACH 301, as denoted by $T_p$=0.4 ms. In this case, the RACH 302 can use sequences much more than the RACH 301.

The RACH 303 has the RACH structure in which the preamble is repeated three times, so that the RACH 303 is very resistant to the frequency offset.

If the RACH must be designed to support a large-sized cell and a greater sequence re-use rate, the RACH length ($T_R$) may be longer than 1 TTI, the length of the RACH 303 is set to 2 ms, the CP length ($T_{CP}$) is equal to or less than 405 μs, the guard time ($T_G$) is set to 395 μs, and the preamble length ($T_P$) is set to 0.4 ms.

If the preamble is repeated within the RACH slot as shown in the RACH 302 and the RACH 303, the Node-B has a method for deciding the frequency offset on the basis of the received preamble signal. In other words, if the frequency offset is estimated on the basis of the repeated pattern, the frequency offset is removed from the reception signal, so that no performance reduction occurs in detecting the preamble.

In more detail, if the preamble includes the repeated structure in a time area, a sub-carrier space including the sequence in a frequency area is changed. N number of repetitions (i.e., N-times repetitions) on the time axis in the time area indicate that the sequences is inserted in the frequency area while being spaced apart from each other at intervals of the N sub-carrier.

Therefore, the sequence signals are loaded on all the neighboring sub-carriers if the RACH preamble is not repeated. If the preamble is repeated two times as shown in the RACH 302, the sequences spaced apart from each other at intervals of two partitions are loaded on the neighboring sub-carriers. If the preamble is repeated three times as shown in the RACH 303, the sequences are spaced apart from each other at intervals of three partitions and are loaded on the sub-carriers.

Under this situation, if the frequency offset occurs, the influence of interference becomes lower in proportion to the size of the space including the sequence, and the detection throughput and the false alarm rate are deteriorated.

Figure 8:
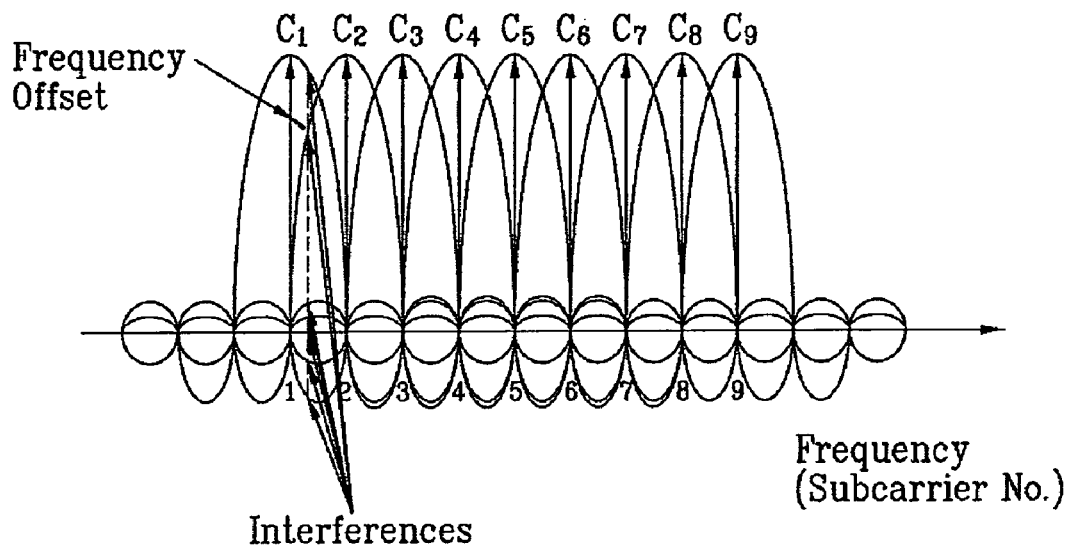
FIGS. 8 and 9 are conceptual diagrams illustrating a method for reducing the influence of a frequency offset in a frequency area under the condition that the RACH preamble has the repeated structure according to one embodiment of the present invention.
Figure 9:
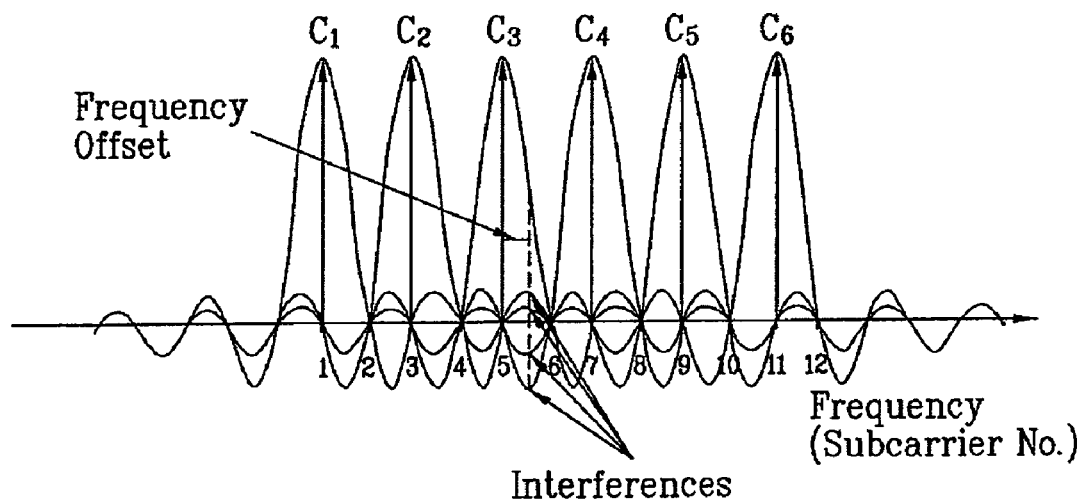

FIGS. 8 and 9 are conceptual diagrams illustrating a method for reducing the influence of a frequency offset in a frequency area under the condition that the RACH preamble has the repeated structure according to one embodiment of the present invention.

As can be seen from FIG. 8, the RACH preamble does not include the repeated structure in the time area, so that the preamble sequence is delivered to all the sub-carriers.

As can be seen from FIG. 9, the RACH preamble is repeated two times in the time area, so that the sequence is delivered at intervals of two sub-carriers.

If the frequency offset exists as shown in FIG. 8, it can be recognized that the high interference received from the neighboring sub-carrier is very high. In FIG. 9, no sequence is delivered to the neighboring sub-carrier, so that the interference signal is relatively lower than that of FIG. 8.

Therefore, if the preamble is repeated within a single RACH, the false alarm rate of the Node-B can be reduced although the frequency offset exists.

The detection throughput and the false alarm rate on the condition that the preamble is designed to have the repeated structure in the RACH structure will hereinafter be described in detail.

Figure 10:
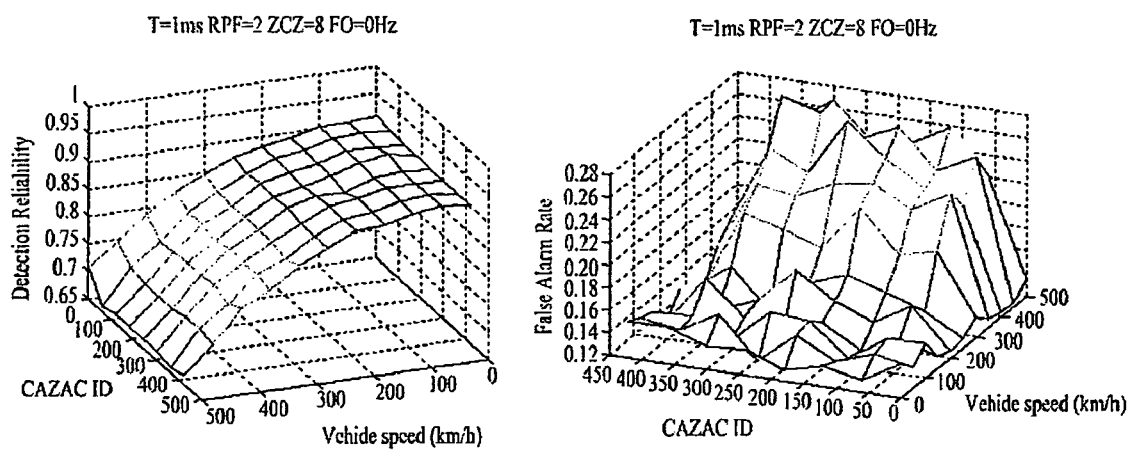
FIGS. 10 and 11 are graphs illustrating detection throughputs and false alarm rates when the RACH is designed to repeat the preamble two times according to one embodiment of the present invention.
Figure 11:
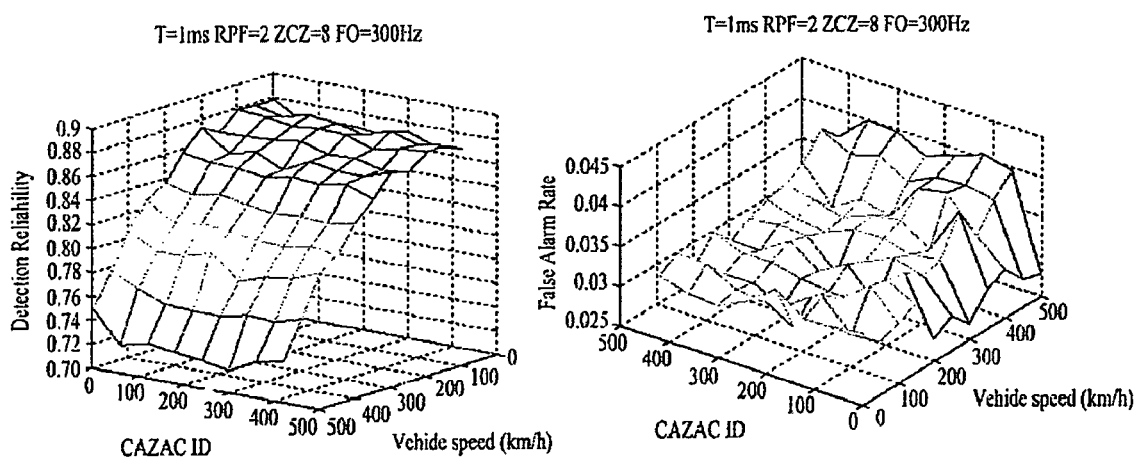

FIGS. 10 and 11 are graphs illustrating detection throughputs and false alarm rates when the RACH is designed to repeat the preamble two times according to one embodiment of the present invention.

Referring to FIGS. 10 and 11, in the same manner as in FIGS. 3 to 6, provided that a CAZAC sequence is used as a sequence, and the frequency-area detector is employed in a typical urban (TU) channel having the Ep/No (i.e., the ratio of a pilot signal to noise) of 18 dB, the detection throughput under a frequency offset 0 Hz is depicted in the left side of FIG. 10, and the false alarm rate under the same frequency offset 0 Hz is depicted in the right side of FIG. 10. Provided that a CAZAC sequence is used as a sequence, and the frequency-area detector is employed in a typical urban (TU) channel having the Ep/No (i.e., the ratio of a pilot signal to noise) of 18 dB, the detection throughput under a frequency offset 300 Hz is depicted in the left side of FIG. 11, and the false alarm rate under the same frequency offset 300 Hz is depicted in the right side of FIG. 11. One axis in the plane direction of each graph of FIGS. 10 and 11 is indicative of an index of the CAZAC sequence, and the other axis is indicative of the UE speed.

Compared with FIGS. 5 and 6, the false alarm rate depicted in the right side of each graph in FIGS. 10 and 11 is decreased down to the available range.

In the meantime, although it is difficult to greatly improve the detection throughput depicted in the left side of FIGS. 10 and 11, it can be recognized that the detection throughput is evenly generated.

In more detail, the detection throughput of FIGS. 3 to 6 is not changed with the UE speed in a specific CAZAC index, and is always poor. The detection throughput in FIGS. 10 and 11 is sequentially decreased according to the UE speed.

It can be recognized that the detection throughput and the false alarm rate of FIGS. 10 and 11 are superior to those of FIGS. 5 and 6.

Figure 12:
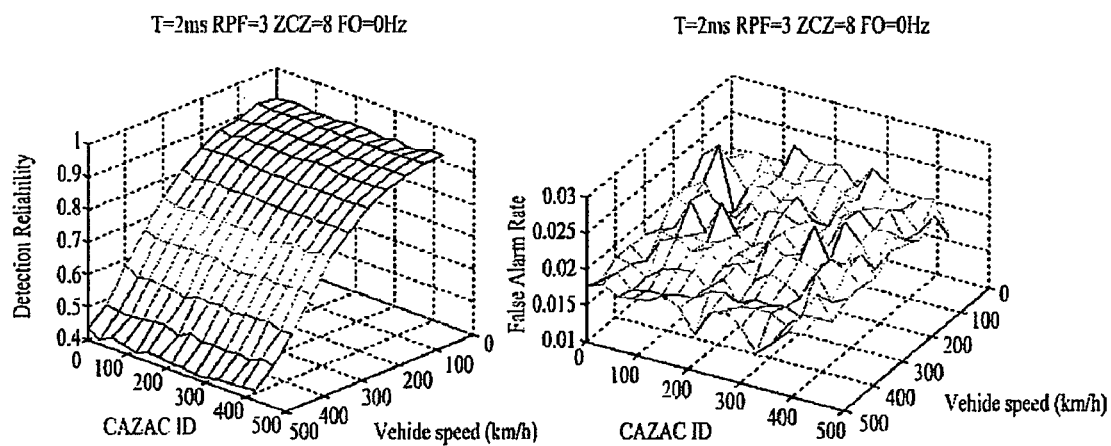
FIGS. 12 and 13 are graphs illustrating detection throughputs and false alarm rates when the RACH is designed to repeat the preamble three times according to one embodiment of the present invention.
Figure 13:
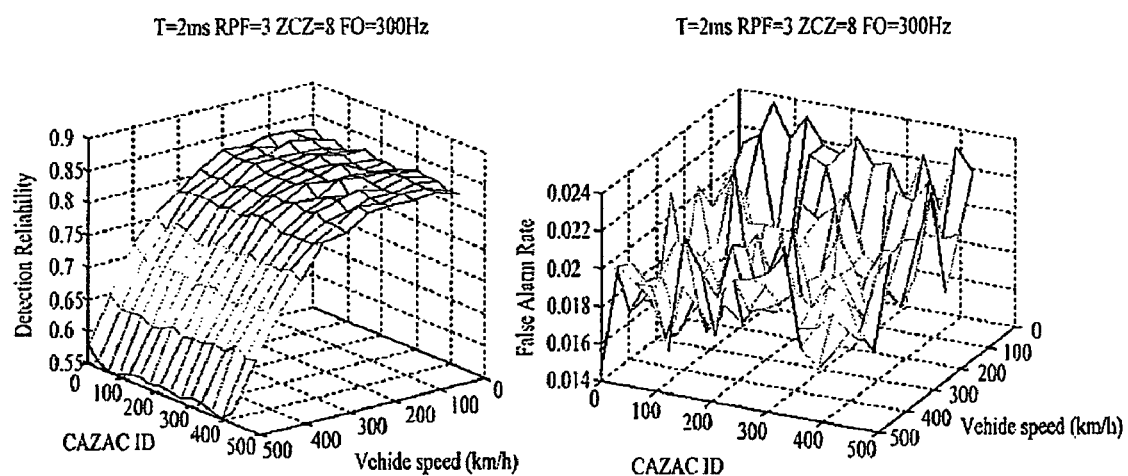

FIGS. 12 and 13 are graphs illustrating detection throughputs and false alarm rates when the RACH is designed to repeat the preamble three times according to one embodiment of the present invention.

Referring to FIGS. 12 and 13, in the same manner as in FIGS. 3 to 6, provided that a CAZAC sequence is used as a sequence, and the frequency-area detector is employed in a typical urban (TU) channel having the Ep/No (i.e., the ratio of a pilot signal to noise) of 18 dB, the detection throughput under a frequency offset 0 Hz is depicted in the left side of FIG. 12, and the false alarm rate under the same frequency offset 0 Hz is depicted in the right side of FIG. 12. Provided that a CAZAC sequence is used as a sequence, and the frequency-area detector is employed in a typical urban (TU) channel having the Ep/No (i.e., the ratio of a pilot signal to noise) of 18 dB, the detection throughput under a frequency offset 300 Hz is depicted in the left side of FIG. 13, and the false alarm rate under the same frequency offset 300 Hz is depicted in the right side of FIG. 13. One axis in the plane direction of each graph of FIGS. 12 and 13 is indicative of an index of the CAZAC sequence, and the other axis is indicative of the UE speed.

If the detection throughput and the false alarm rate of FIGS. 12 and 13 are compared with those of FIGS. 10 and 11, it can be recognized that the false alarm rates of FIGS. 12 and 13 have not been greatly improved as compared with those of FIGS. 10 and 11. This means that the sub-carrier space is sufficiently guaranteed even if the preamble is repeated two times as shown in FIGS. 10 and 11. So, although the sub-carrier space is additionally guaranteed by the preamble repeated three times, the detection throughput may not be greatly improved by the aforementioned preamble repeated three times, so that there is little difference in detection throughput between the first preamble repeated two times and the second preamble repeated three times.

The RACH preamble is designed to have the repeated structure. A method for detecting the RACH signal when the UE transmits the RACH signal will hereinafter be described in detail.

If a frequency offset corresponding to the half-subcarrier space of a transmitted (Tx) RACH signal occurs during the reception of the RACH signal in which the sequence is inserted in sub-carriers spaced apart from each other by a predetermined distance, the peak level becomes lower. Accordingly, it is preferable that the sequence detection may be performed at a location, where no sequence is loaded, during the preamble detection.

In other words, if the sequence is delivered to the sub-carrier indexes (Nos. 1, 3, 5, 7, 9, . . . ) as shown in FIG. 9, sub-carrier indexes (Nos. 2, 4, 6, 8, 10, . . . ) are contained in the sequence during the preamble detection, and the sequence detection is then executed.

In this case, it is preferable that the frequency offset may be detected in two cases (i.e., a first case in which the frequency offset is positive and a second case in which the frequency offset is negative). In other words, the frequency offset may be detected under two assumptions (i.e., a first assumption in which the sequence is shifted to the right by a single partition, and a second assumption in which the sequence is shifted to the left by a single partition)

There are a variety of methods for enabling the RACH preamble to include the repeated structure. The following embodiment may also relate to one of the aforementioned methods.

Figure 14:
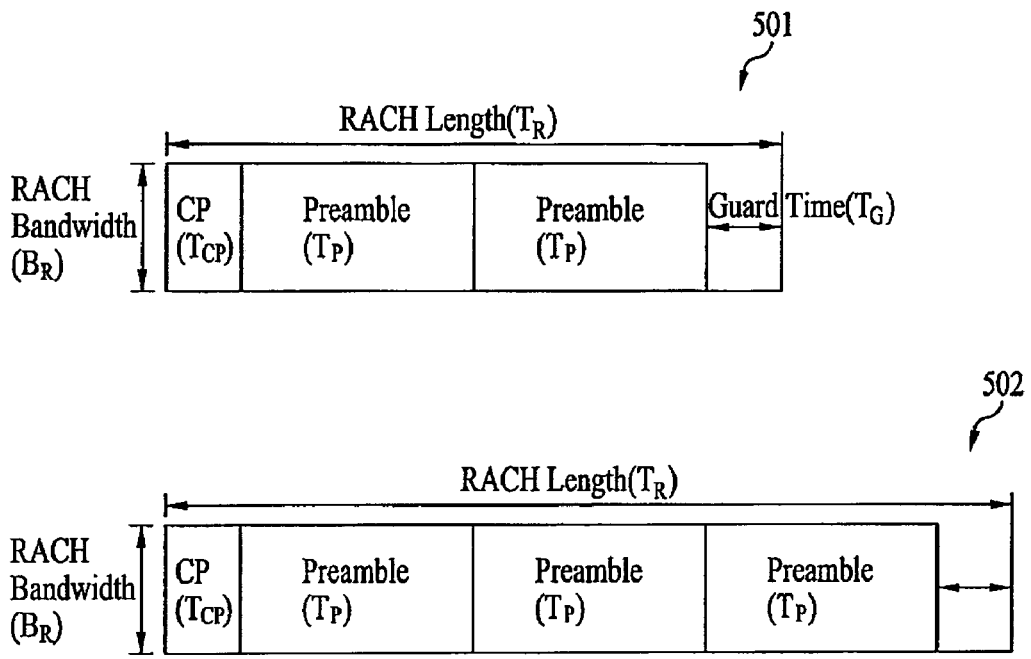
FIGS. 14 to 16 are conceptual diagrams illustrating a variety of schemes for allocating the repeated structure to the RACH preamble according to one embodiment of the present invention.
Figure 15:
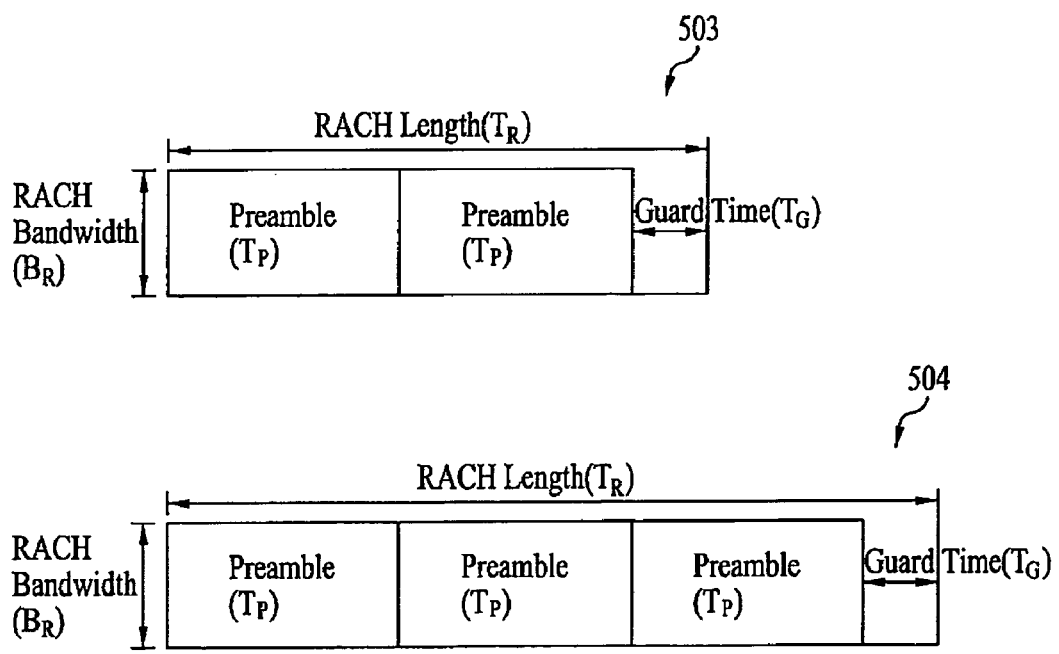
Figure 16:
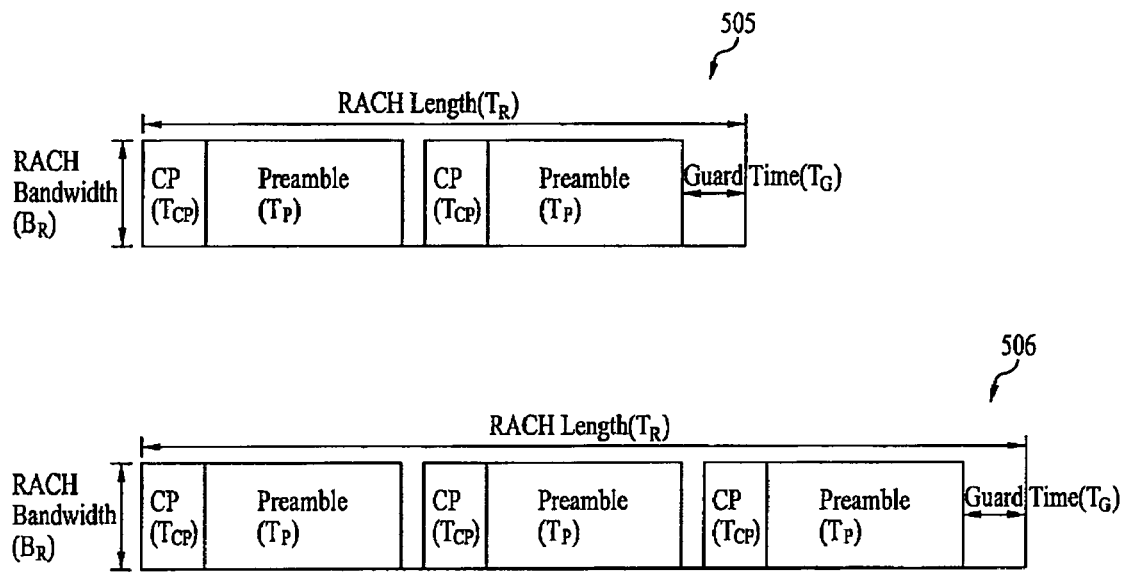

FIGS. 14 to 16 are conceptual diagrams illustrating a variety of schemes for allocating the repeated structure to the RACH preamble according to one embodiment of the present invention.

The number of preamble repetitions may be 2, 3, or any other number if required.

In FIGS. 14 to 16, each of the RACH 501, the RACH 503, and the RACH 505 includes the twice-repeated structure, and each of the RACH 502, the RACH 504, and the RACH 505 includes the thrice-repeated structure. Therefore, in the case of the RACH 501, the RACH 503, and the RACH 505, the sequence is inserted in each RACH on the frequency axis at intervals of two sub-carriers. In the case of the RACH 502, the RACH 504, and the RACH 506, the sequence is inserted in each RACH at intervals of three sub-carriers.

The embodiment of FIG. 14 shows that the CP is inserted in the RACH. The embodiment of FIG. 15 shows that the CP is not inserted in the RACH. The embodiment of FIG. 16 includes the CP, shows that the repeated structure corresponds to the overall RACH including the CP, and shows that both structures of FIG. 16 are spaced apart from each other by a predetermined distance.

Compared with FIGS. 14 and 15, the embodiment of FIG. 15 is more difficult for maintaining the orthogonality in FIG. 14, but it can increase the preamble length by a length corresponding to the CP length.

The sub-carrier space on the frequency axis is changed according to the inverse number of the RACH preamble length. If the RACH preamble includes N-times repeated structure, and the sequence is transmitted at intervals of the N sub-carrier space, the RACH preamble length is too short, as shown in FIG. 14, and the sub-carrier space in which the sequence of the frequency area is inserted may excessively increase. Therefore, the preamble length is adjusted according to the presence or absence of the inserted CP of FIGS. 14 and 15, so that the sub-carrier space of the frequency area can also be adjusted.

If the overall RACH structure including the CP is repeated as shown in FIG. 16 and a predetermined space is established among individual RACH structures, independent sequences are inserted into individual RACH preambles, and the RACH signals are distinguished by the combination of the inserted sequences, so that the number of available sequences may increase.

According to one embodiment of the present invention, there are a variety of schemes for allocating the repeated structure to the RACH preamble, and the scope of the present invention is not limited to any one of the schemes.

In the meantime, according to another embodiment of the present invention, it is assumed that a first preamble is used as the CP, differently from FIG. 15 having no CP in the RACH structure.

In other words, in order to process the RACH in the frequency area, it is preferable that the RACH structure includes the CP. Generally, the CP is independently defined in the RACH structure as shown in FIG. 14 or 16.

However, in the case of defining the RACH 503 or 504 including the repeated structure as shown in FIG. 15, if the reception end can detect the RACH preamble caused by the frequency offset without any problem, a first preamble part of the above-mentioned RACH structure is simply considered to be the CP, and is then processed. If the signal is detected according to the processed result of the first preamble part, and the timing point or the frequency offset is detected, all the parts reaching the first preamble are considered to be the preamble, so that the resultant structure can be processed.

The above-mentioned embodiment of the present invention may be applied to a large-sized cell in which the RACH is designed. For example, according to the 3GPP LTE, although the cell size increases up to 30 Km, there is no problem in system operation. In addition, although the cell size increases up to 100 Km instead of 30 Km, the system may be normally operated. In this case, the CP unavoidably increases in proportion to the cell size, a distinction between different preamble structures based on various cell sizes makes the transceiver structure complicated.

Therefore, the present invention provides a method for defining the RACH structure including a single CP length capable of supporting not only general-sized cells but also a sufficiently-large-sized cell, and employing the aforementioned method. In this case, the single CP length capable of supporting the sufficiently-large-sized cell size is set to the preamble length, so that the present invention provides a method for adaptively receiving the RACH structure according to the receiver situation in which the frequency offset and the cell size are considered.

In more detail, the basic RACH structure having the length of 1 ms is defined by $\{(0.1+\Delta)\text{ms}+0.8\text{ ms}+(0.1-\Delta)\text{ms}\}$ under the condition of {CP length+Preable length+Guard time length}, and the defined RACH structure is then used.

The RACH structure of the length 2 ms or more to support the larger cell will be defined as follows.

Figure 17:
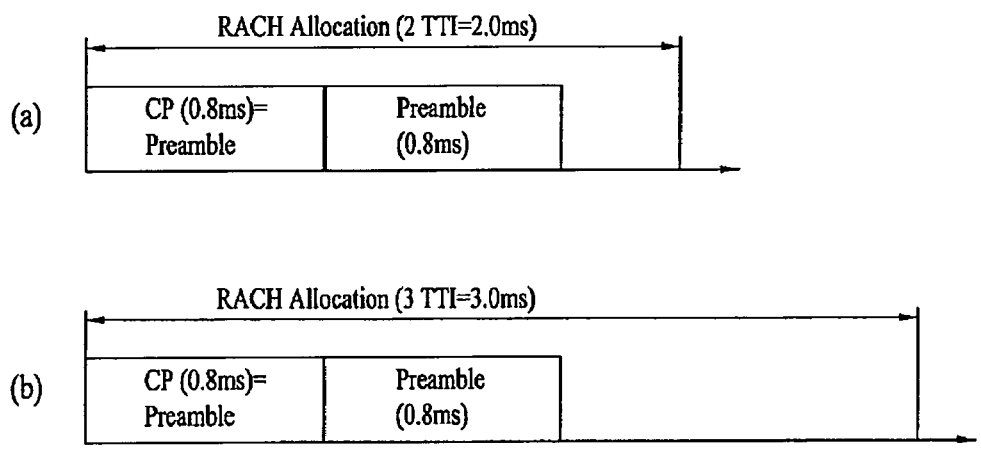
FIG. 17 is a conceptual diagram illustrating a method for allocating the repeated structure to the RACH preamble, and enabling some parts of the repeated preamble to be used as a cyclic prefix (CP) according to the present invention.

FIG. 17 is a conceptual diagram illustrating a method for allocating the repeated structure to the RACH preamble, and enabling some parts of the repeated preamble to be used as a cyclic prefix (CP) according to the present invention.

FIG. 17A shows the RACH structure of the length 2 ms (i.e., the RACH structure of 2 ms). This RACH length can be represented by $\{(0.8+\Delta)\text{ms}+0.8\text{ ms}+(0.4-\Delta)\text{ms}\}$. This RACH can support the cell size having the radius of up to about 60 Km.

And, in order to define the RACH capable of supporting the additional cell size, the structure of FIG. 17B can be additionally defined. FIG. 17B shows the RACH structure of the length 3 ms equal to $\{(0.8+\Delta)\text{ms}+0.8\text{ ms}+(1.4-\Delta)\text{ms}\}$.

Namely, the present invention provides a method for defining/using a single CP length capable of supporting the large-sized cell, and the number of preamble repetitions may be changed according to the total length of the RACH and/or the degree of the frequency offset. As a result, the RACH structure according to the above embodiment can be defined by the following equation:

$$\{(0.8+\Delta)\text{ms}+0.8{\times}n\text{ ms}+(y-(0.8{\times}(n+1)+\Delta))\text{ms}\} \quad \text{[Equation]}$$

In the above-mentioned RACH structure, "$\Delta$" is indicative of an adjustment value acquired when a delay profile of a channel is considered, a detailed value of "$\Delta$" may be set to the positive(+) or negative(−) value or zero. Preferably, "$\Delta$" may be set to zero "0".

The RACH structure according to the above-mentioned embodiment can be effectively detected from all of the frequency area and the time area. The reception end may use a first preamble part as a repetition structure of the preamble according to situations of the corresponding reception end, or may also use the first preamble part as the CP. And, the above-mentioned RACH structure may be used for the large-sized cell, and may be very resistant to the frequency offset.

In the meantime, according to the above-mentioned scheme for repeating the RACH preamble, many more RACH structures can be proposed according to target objects to be considered.

According to another embodiment, the present invention provides a variety of RACH structures having the length of several TTIs to support a large-sized cell, and the preamble is repeated a various number of times in the individual RACH structures. The present invention according to another embodiment provides a method for combining the above-mentioned RACH structure in various ways in consideration of the number of bits indicating each RACH structure, and employing the combination of the RACH structures.

According to yet another embodiment, the present invention provides an effective preamble for solving the frequency offset problem, and a sequence repetition method for use in the above-mentioned effective preamble.

A detailed description of the general RACH transmission structure and the influence of the frequency offset will hereinafter be described.

Generally, the RACH supports multiple users (hereinafter referred to as a multi-user). When each UE gains access to the RACH, it transmits a specific preamble sequence. If the Node-B recognizes the preamble sequence and transmits a signal to a downlink, the UE updates its time synchronization information using the above-mentioned transmission (Tx) signal. In this case, if the frequency synchronization information is also transmitted to the downlink, this frequency information can also be used as UE information.

Basic requirements of the RACH aim to satisfy a variety of conditions associated with the round trip delay (RTD) and the path loss.

Presently, the 3GPP LTE is intensively discussing the RACH structure, which has the length of 1 ms TTI, the preamble length of 0.8 ms, and the guard time of 100 μs. The guard time acquired when the channel delay spread is excluded from the total guard time of 100 μs can cover a maximum of the cell size of 15 Km.

However, it should be noted that the cell size may be larger than 15 Km if required. Presently, many developers are discussing a new method for enabling the guard time to cover the cell size of 30 km or more, so that there is needed a method for employing the RACH having the length of several TTIs.

In the meantime, the above-mentioned RACH preamble is transmitted before a closed loop is formed between the UE and the Node-B, so that a corresponding signal is generated/transmitted from the UE itself. As a result, the RACH preamble is very vulnerable to the frequency offset. If the Node-B receives the RACH caused by the aforementioned frequency offset, the false alarm rate may increase or the detection probability may decrease.

The following embodiment of the present invention provides another RACH structure in which either a preamble or a sequence applied to the preamble is repeated in association with the above frequency offset problem. Specifically, the following embodiment provides a method for more effectively solving the frequency offset problem using the same number of repetitions as in the above-mentioned embodiment, and provides an effective RACH transmission/reception method in consideration of the aforementioned frequency offset problem, the cell size, and the RACH structure. A detailed description of the following embodiment will hereinafter be described.

Recently, there is proposed a method for repeating the preamble to support a large-sized cell. The 3GPP LTE provides a basic RACH structure having the total length of 1.0 ms and the preamble length of 0.8 ms. By this RACH structure, the system can support the cell of the radius 15 km.

Under the aforementioned improved UTRA structure, the RACH must support the cell having the radius of up to 30 Km, and this cell of the radius 30 km is double the radius supportable by the above-mentioned basic RACH structure.

Considering a variety of RTDs under the above-mentioned situation, a variety of available RACH structures may be proposed, as shown in the following Table 1:

TABLE 1

| Type | RACH length | RPF | Cell size (km) | Parameters |
|---|---|---|---|---|
| 1 | 1.0 ms | 1 | ~15 | CP = 0.1 ms, Preamble = 0.8 ms, GT = 0.1 ms |
| 2 | 2.0 ms | 2 | 15~30 | CP = 0.2 ms, Preamble = 1.6 ms, GT = 0.2 ms |
| 3 | 2.0 ms | 1 | 30~90 | CP = 0.6 ms, Preamble = 0.8 ms, GT = 0.6 ms |
| 4 | 3.0 ms | 3 | 30~45 | CP = 0.3 ms, Preamble = 2.4 ms, GT = 0.3 ms |
| 5 | 3.0 ms | 2 | 45~105 | CP = 0.7 ms, Preamble = 1.6 ms, GT = 0.7 ms |
| 6 | 3.0 ms | 1 | 45~120 | CP = 0.8 ms, Preamble = 0.8 ms, GT = 1.4 ms |

In Table 1, "RPF" is an abbreviation of a repetition factor, and indicates the number of preamble repetitions. "CP" is indicative of the length of a cyclic prefix (CP), and "GT" is indicative of the length of a guard time.

The above-mentioned RACH structures associated with Table 1 will hereinafter be described.

Figure 18:
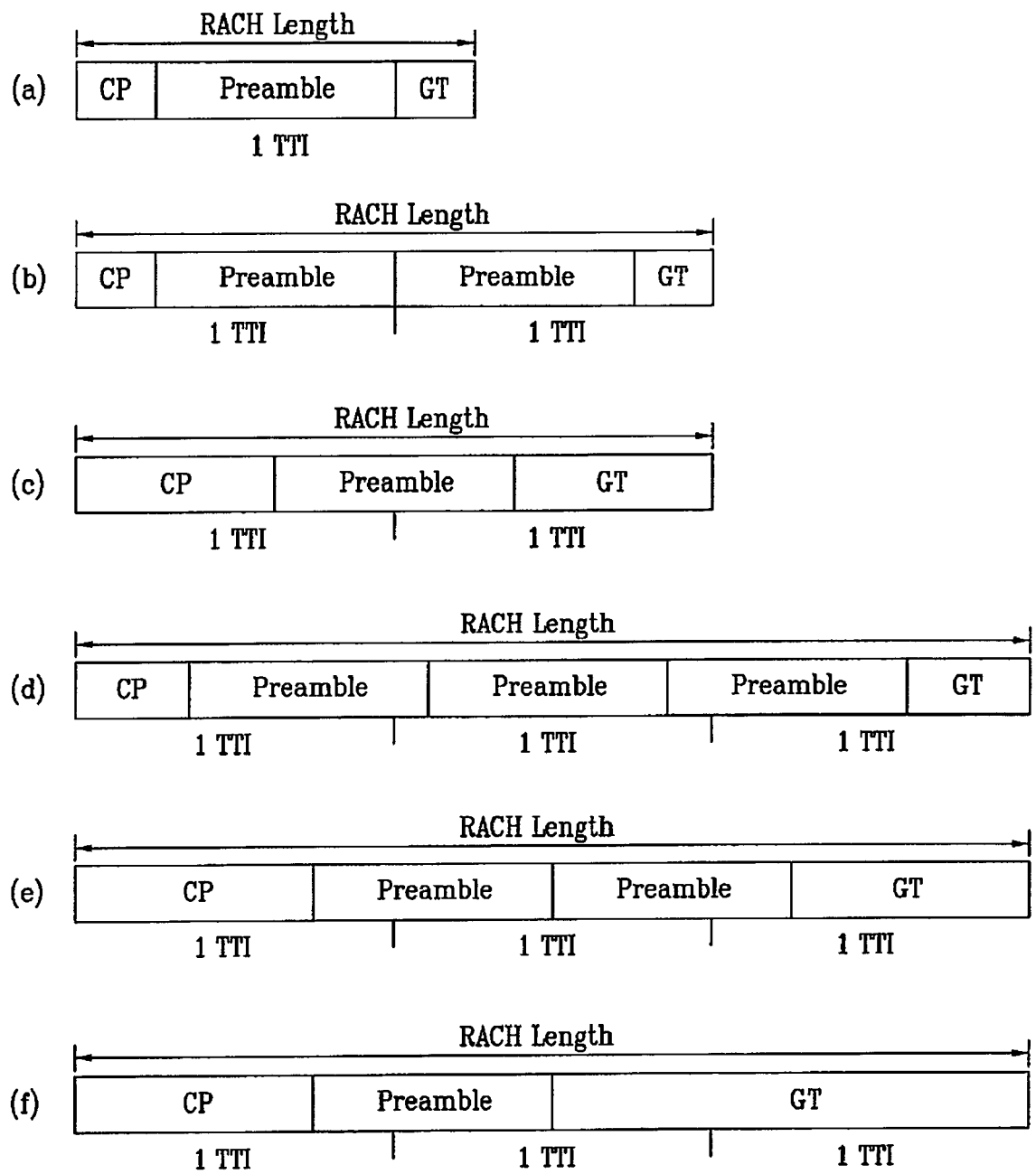
FIG. 18 shows RACH structures for supporting several TTI lengths used for a large-sized cell, and including the preamble-repeated structure in which the preamble is repeated a various number of times according to the present invention.

FIG. 18 shows RACH structures for supporting several TTI lengths used for a large-sized cell, and including the preamble-repeated structure in which the preamble is repeated a various number of times according to the present invention.

FIG. 18A shows a first-type RACH structure (hereinafter referred to as a first RACH structure). FIG. 18B shows a second-type RACH structure (hereinafter referred to as a second RACH structure). FIG. 18C shows a third-type RACH structure (hereinafter referred to as a third RACH structure). FIG. 18D shows a fourth-type RACH structure (hereinafter referred to as a fourth RACH structure). FIG. 18E shows a fifth-type RACH structure (hereinafter referred to as a fifth RACH structure). FIG. 18F shows a sixth-type RACH structure (hereinafter referred to as a sixth RACH structure). The supportable cell sizes of the above various RACH structure are determined by the CP length and the GT length. Namely, as can be seen from FIG. 18 and Table 1, the supportable cell size increases by 15 km per the GP length 0.1 ms. Therefore, the CP length and the GP length are determined according to appropriate coverage areas.

The RACH structure may be decided in consideration of the number of preamble repetitions allowed by the system.

If the system supports only two repetitions of the preamble, the first, second, and third RACH structures of FIG. 18 may be used to support the large-sized cell. In this case, the basic structure of the first RACH structure may be used in the coverage range of 15 km. The second RACH structure in which the preamble is repeated two times can support the cell size of up to 30 km. The third RACH structure having the length of 3 TTIs simultaneously while having a single preamble can support the cell size of up to 30~90 km.

If the system supports three repetitions of the preamble, the first, second, fourth, and fifth RACH structures shown in Table 1 and FIG. 18 may be used in coverage areas of individual RACH structures themselves.

The present invention considers the coverage areas based on the CP and GT lengths, the number of preamble repetitions allowed by the system, and the number of bits signaling the available RACH structures, and provides the set of RACH structures available for the system in consideration of the above-mentioned factors, so that it may use the following combinations of RACH structures. The combinations of the RACH structures are shown in the following Table 2:

TABLE 2

| Combination (Type) | The number of signalling bits | Maximum-allowable RPF | Maximum of supportable cell size (~Km) |
|---|---|---|---|
| 1  1, 3, 6 | 1 | 1 | 15/90/120 |
| 2  1, 2, 3, 5, 6 | 2 | 2 | 15/30/90/105/120 |
| 3  1, 3, 4, 6 | 2 | 3 | 15/90/105/120 |
| 4  1, 2, 5, 6 | 2 | 2 | 15/30/105/120 |
| 5  1, 2, 3, 5 | 2 | 2 | 15/30/90/105 |

In Table 2, the type index contained in each combination is indicative of a type index associated with the RACH structures of FIG. 1. The number of signaling bits is indicative of the number of bits required when the Node-B discriminates the RACH structures contained in individual combinations and informs each UE of the discrimination result. The maximum-allowable RPF is indicative of the maximum number of preamble repetitions allowed by the system. The maximum of supportable cell size is indicative the size of coverage areas supportable by the RACH structures contained in the individual combinations.

In more detail, according to the first combination, the system may use the first, third, and sixth RACH structures. In this case, the third RACH and the sixth RACH have the same preamble length, so that there is no need for the Node-B to inform each UE of the discrimination result of the third and sixth RACH structures. The Node-B makes the CP length and the GT length empty according to the individual RACH types, so that it can distinguish the RACH signal from each other. Therefore, if the system supports the above-mentioned three RACH structures, the Node-B can inform each UE of the used RACH structure via the signaling message composed of 1 bit.

In more detail, according to the second combination, the system may use the first, second, third, fifth, and sixth RACH structures. In this case, the third RACH and the sixth RACH have the same preamble length, and the Node-B need not inform each UE of the discrimination result of the third and sixth RACH structures, so that the Node-B can inform each UE of the used RACH structure via the signaling message composed of 2 bits.

According to the third combination, the system may use the first, third, fourth, and sixth RACH structures. In this case, the third RACH and the sixth RACH have the same preamble length, so that the Node-B need not inform each UE of the discrimination result of the third and sixth RACH structures. However, although the third RACH structure is not distinguished from the sixth RACH structure, the system requires the signaling message of 2 bits to indicate three cases, so that the above-mentioned four RACH structures may be distinguished from each other by the above-mentioned signaling message.

The system according to another embodiment of the present invention distinguishes the third RACH structure from the sixth RACH structure, the remaining one of the four cases capable of being indicated by the above signaling message of 2 bits may indicate a specific usage of the RACH. For example, the remaining one case may indicate a control channel or may also indicate the overwriting of a data channel.

According to the fourth combination, the system may use the first, second, fifth, and sixth RACH structures. In this case, the second RACH structure and the fifth RACH structure have the same preamble structure, so that the Node-B need not inform each UE of the discrimination result of the second and fifth RACH structures. Therefore, in the same manner as in the third combination, the signaling message of 2 bits of the fourth combination may indicate four RACH structures contained in the fourth combination, does not distinguish the second RACH structure from the fifth RACH structure from among the four RACH structures contained in the fourth combination, and may also allow the remaining one of four cases capable of being indicated by the signaling message of 2 bits to indicate a specific usage of the RACH.

According to the fifth combination, the system may use the first, second, third, and fifth RACH structures. In this case, the Node-B may discriminate among the aforementioned four RACH structures using the signaling message of 2 bits.

In association with Table 2, the above-mentioned RACH combination may be decided by each system which specifies the RACH structure to be used via the signaling message, and allows the UE to transmit the RACH signal using the decided RACH structure.

Also, a single system can also support several RACH structures from among a variety of RACHs contained in the combinations shown in Table 2. For example, if a single system supports several RACH structures, it uses different RACH structures according to the UE's location within the cell, resulting in the prevention of wasted resources. In this case, the wasted resources are generated when the long-length RACH, which has been designed on the basis of a specific UE located at the cell edge, may also be used by the second UE located at the center of the cell.

According to the combinations of Tables 1 and 2, the length of the preamble contained in either one of the third and sixth RACH structures may be equal to the CP length. For example, as shown in Table 1, each of the preamble length and the CP length may be set to 0.8 ms. However, it should be noted that the preamble length and the CP length may also be set to other values if required, differently from Table 1.

The CP length of the various RACH structures in Table 1 may be longer than each value shown in Table 1 by a predetermined length, and the GT length may be shorter than each value shown in Table 1 by a predetermined length.

In the meantime, if the sequence is repeated to implement the RACH preamble sequence, a method for effectively repeating the sequence to reduce the influence of the frequency offset will hereinafter be described.

If the RACH length and the preamble length increase to support the large-sized cell, the sequence applied to the preamble may be simply repeated so that the system can support the large-sized cell. This sequence repetition structure is equal to the second, fourth, or fifth RACH structure shown in Table 1 and FIG. 18. According to the above-mentioned structure, correlation characteristics between a current UE's preamble and another UE's preamble can be maintained, so that the system can support different cell sizes according to the repeated preamble.

If the preamble is simply repeated as described above, the range of supportable frequency offset may be limited. For example, in the case of the second, fourth, and fifth RACH structures of FIG. 1, the system can support the frequency offset of up to 625 Hz.

Therefore, the present invention provides a method for discriminating individual repetition parts in the sequence repetition parts applicable to the preamble, reducing the sequence repetition period, so that it can support the range of a higher frequency offset.

Figure 19:
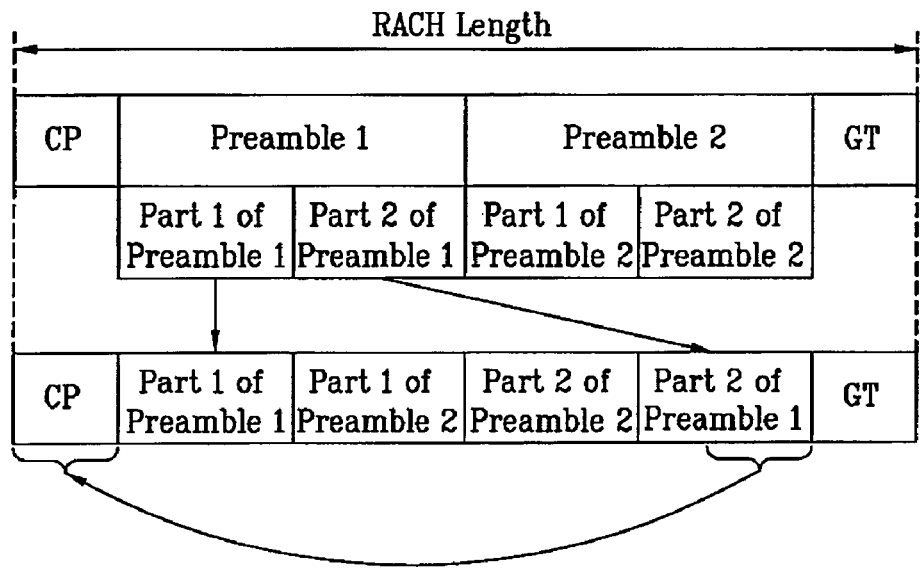
FIG. 19 is a conceptual diagram illustrating a method for dividing a preamble sequence repeated two times into two parts and rearranging the same so as to reduce the influence of a frequency offset according to the present invention.

FIG. 19 is a conceptual diagram illustrating a method for dividing a preamble sequence repeated two times into two parts and rearranging the same so as to reduce the influence of a frequency offset according to the present invention.

According to the embodiment of FIG. 19, each of the repetition parts (i.e., a first preamble 1 and a second preamble 2) of an original preamble sequence repeated two times is divided into a first part and a second part. Each of the divided part can be ordered as follows. Namely, the Preamble 1 is divided into a first part (Part 1) and a second part (Part 2), and the Preamble 2 is divided into a first part (Part 1) and a second part (Part 2).

The first parts of the preambles 1 and 2 in each repetition sequence may be arranged in the front part, and the second parts of the preambles 1 and 2 may follow the above-mentioned first parts.

According to the arrangement method of FIG. 19, the first part of the first preamble 1 is arranged, the first and second parts of the second preamble 2 are arranged, and the second part of the first preamble 1 is then arranged, so that the sequence rearrangement becomes simplified. A detailed arrangement method of the sequence may follow the other order. For example, the first part of the first preamble 1, the first part of the second preamble 2, the second part of the first preamble 1, and the second part of the second preamble 2 may be sequentially arranged if required.

If the sequence is repeated according to the above-mentioned embodiment of FIG. 19, the preamble duration may be reduced in half as compared to those of the second, fourth, and fifth RACH structures of Table 1. Therefore, the range of supportable frequency offset may increase up to 1250 Hz. The embodiment of FIG. 19 is less vulnerable to the frequency offset than the simply-repeated preamble sequence.

According to yet another embodiment, the present invention repeatedly applies the preamble sequence, specifically, it applies the circular shift (CS) to at least one of the repeated parts so that it can indicate additional information. A detailed description thereof will hereinafter be described.

Figure 20:
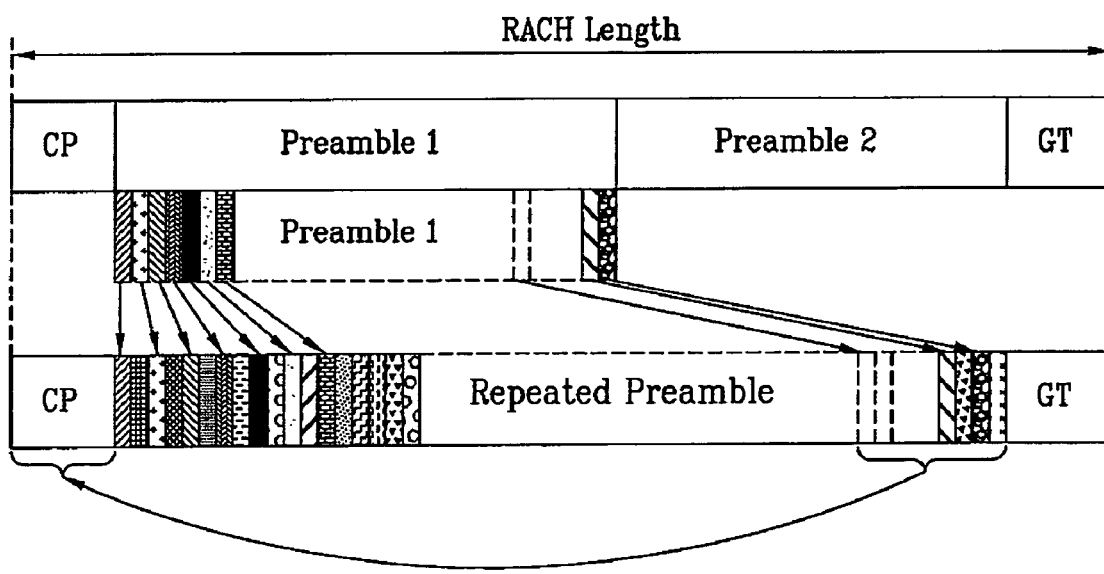
FIG. 20 is a conceptual diagram illustrating a method for repeatedly applying the sequence, and applying a circular shift (CS) to some parts of the repeated part according to one embodiment of the present invention.

FIG. 20 is a conceptual diagram illustrating a method for repeatedly applying the sequence, and applying a circular shift (CS) to some parts of the repeated part according to one embodiment of the present invention.

According to the structure of FIG. 20, the sequence repetition method is more generalized than FIG. 19.

Referring to FIG. 20, if the preamble sequence is repeated two times, and is then applied to the system, each repetition part is divided into at least two parts, and the divided parts of each repetition part are re-arranged according to a predetermined order.

If each sequence repetition part is divided into several parts as shown in FIG. 20, the several parts may be distinguished from each other by chip level information.

In this way, if each repetition part of the sequence is divided into several parts as described above, the repetition duration of the preamble becomes shorter according to the number of division times, and the range of the frequency offset supportable by the RACH may increase in proportion to the above-mentioned number of division times.

The present invention may apply the circular shift (CS) to at least one of several sequence repetition parts as shown in FIG. 20, so that it may indicate additional information. In more detail, provided that the discrimination unit of individual sequence repetition parts is set to the chip level, the circular shift (CS) is applied over two chips in a second sequence repetition part (i.e., the second preamble 2). Therefore, the division parts of the second preamble 2 in the sequence repetition structure are shifted by 2 chips as compared to those of the first preamble 1, and are then rearranged.

If the circular shift (CS) is applied to a specific part of the sequence repetition part according to the embodiment of the present invention, the CS-resultant sequence can indicate additional information, and can reduce the number of wrong timing estimations caused by the repetition of the same sequence.

In other words, the first preamble 1 and the second preamble 2 correspond to the repetition part of the same sequence. If each of the preambles 1 and 2 is divided and rearranged according to the same scheme, the same parts of each sequence are repeated, so that the system may have difficulty in estimating the timing.

However, if the circular shift (CS) is applied to either of the first and second preambles 1 and 2 in which the same sequence is repeated, each preamble is divided into several parts, and the divided parts are re-arranged, the ambiguity of timing estimation caused by the repetition of the same sequence may be reduced.

In the meantime, a variety of problems must be solved to enable the RACH channel to support the large-sized cell. For example, the above problem associated with the frequency offset, the problem of increasing the RACH length, and the deficiency of available sequences.

If the RACH is used in the large-sized cell, the system has difficulty in applying the circular shift (CS) to the sequence due to a high propagation delay, so that the number of available sequences may be decreased.

According to yet another embodiment, the present invention provides a method for masking a specific sequence on the other sequence to be applied to the preamble so as to solve the deficiency of available sequences.

Figure 21:
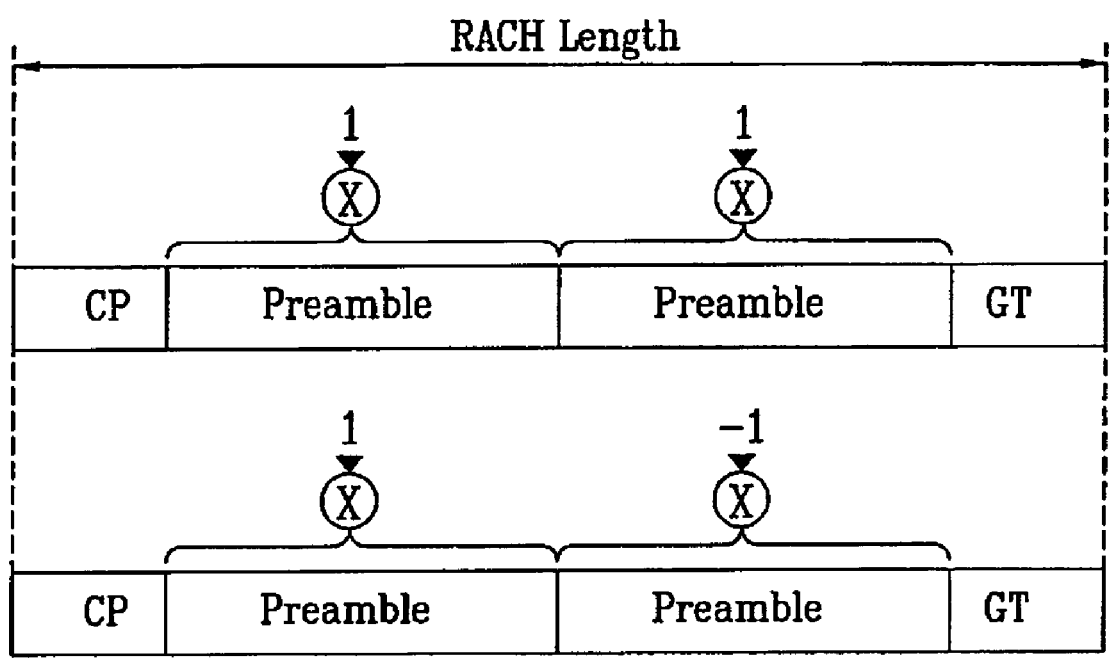
FIG. 21 is a conceptual diagram illustrating a method for masking a predetermined sequence on a preamble sequence and using the masked resultant sequence according to another embodiment of the present invention.

FIG. 21 is a conceptual diagram illustrating a method for masking a predetermined sequence on a preamble sequence and using the masked resultant sequence according to another embodiment of the present invention.

In more detail, FIG. 21 shows the masking process of each preamble sequence under the condition that the preamble sequence is repeated two times. If the preamble sequence is repeated R times, the masking sequence according to this embodiment may be set to the sequence (having the length R) having good cross-correlation/auto-correlation characteristics.

Preferably, the masking sequence of this embodiment may be an orthogonal sequence. However, under the condition that the correlation characteristics of the individual preamble sequences are not deteriorated, the above-mentioned masking sequence may be set to an arbitrary masking sequence as necessary.

As shown in FIG. 21, the masking method for masking the preamble sequence using a specific sequence may also be applied to the above-mentioned embodiments of FIGS. 19 and 20. Each repetition part of the individual preambles includes an overall sequence part, so that the embodiment of FIG. 21 can also satisfy the aforementioned embodiments of FIGS. 19 and 20.

Provided that the masking process of FIG. 21 is executed using the masking sequence having good correlation characteristics in association with FIGS. 19 and 20, all the sequences are re-arranged, so that it can considerably compensate for the weaker correlation characteristics.

In the meantime, the sequence repetition method according to the above-mentioned embodiments of FIGS. 19 to 21 has been disclosed on the basis of the specific case in which the sequence repetition is applied to the RACH preamble. However, it should be noted that the above-mentioned sequence repetition method may also be applied to other channels. For example, the sequence repetition method, the circular shift (CS) application method, and the sequence masking method may also be applied to a SCH channel of the 3GPP LTE system, a sounding channel (e.g., CQ channel), and a pilot channel. And, the above-mentioned sequence repetition method can also be applied to the preamble of the IEEE 802-based system. In other words, the above-mentioned methods according to the individual embodiments may be applied to not only the RACH preamble but also an arbitrary channel required for estimating the frequency offset.

A method for allocating different RACH transmission conditions to the high-speed UE and the low-speed UE will hereinafter be described.

Figure 22:
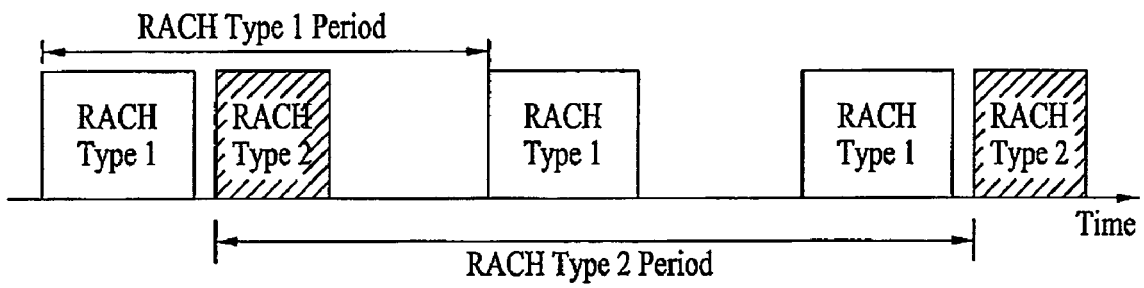
FIG. 22 is a conceptual diagram illustrating a method for establishing the RACH for a high-speed UE and the other RACH for a low-speed UE according to one embodiment of the present invention.

FIG. 22 is a conceptual diagram illustrating a method for establishing the RACH for a high-speed UE and the other RACH for a low-speed UE according to one embodiment of the present invention.

In the remaining cases other than only one case in which the system must allocate only one format to the RACH and must then use the resultant RACH, the present invention may also propose another structure which can be used in different ways according to the UE speed. For example, if all the preambles are reduced in half for the high-speed users, the number of available sequences is unavoidably reduced to ¼ of all sequences. So, the sequence reuse factor is also reduced to ¼, resulting in the occurrence of cell-planning problem.

Provided that the system must support the high-speed UE according to the embodiment of the present invention, the present invention provides a RACH structure for the high-speed UE and the other RACH structure for the low-speed UE, instead of providing the overall RACH structure designed for only the high-speed UE irrespective of the low-speed UE, so that the UE can properly use a corresponding RACH structure.

In this case, a method for allowing the UE to access the RACH can be defined in different ways according to first and second cases. The first case indicates that the UE can estimate its speed during the initial cell searching step, so that the UE can decide whether its speed is higher or lower than a predetermined threshold speed.

FIG. 22 shows a specific case in which the first RACH (RACH Type 1) for the low-speed UE and the second RACH (RACH Type 2) for the high-speed UE are established.

In this case, under the condition that the second RACH (RACH Type 2) for the high-speed UE has no problem when the high-speed UE gains access to the Node-B over the RACH, the following methods may be adapted to allow the high-speed UE to access the Node-B. For example, a method for reducing the RACH length as shown in FIG. 2, or the method for allowing the RACH preamble to include the repetition structure as shown in FIG. 7 may be used. In addition, a method for commanding the high-speed UE to use only a specific sequence may also be used. However, the above-mentioned methods have been disclosed for only illustrative purposes, and the scope of the present invention is not limited to any one of the methods, and can also be applied to other examples as necessary.

The first RACH (Type 1) for the low-speed UE and the second RACH (Type 2) for the high-speed UE can be defined as shown in the following Table 3:

TABLE 3

| Type | Parameter | Structure |
| --- | --- | --- |
| RACH Type 1 | $T_R = 1.0$ ms, $T_P = 0.8$ ms, $T_G = 97.4$ μs | RACH (201) (RPF = 1) |
| RACH Type 2 | $T_R = 1.0$ ms, $T_P = 0.4$ ms, $T_G = 97.4$ μs | RACH (302) (RPF = 2) |
| RACH Type 1* | $T_R = 1.0$ ms, $T_P = 0.4$ ms, $T_G = 97.4$ μs | RACH (302) (RPF = 2) |
| RACH Type 2* | $T_R = 2.0$ ms, $T_P = 0.4$ ms, $T_G = 397.4$ μs | RACH (303) (RPF = 3) |
| RACH Type 1* | $T_R = 1.0$ ms, $T_P = 0.8$ ms, $T_G = 97.4$ μs | RACH (201) (RPF = 1) |
| RACH Type 2* | $T_R = 2.0$ ms, $T_P = 0.4$ ms, $T_G = 397.4$ μs | RACH (303) (RPF = 3) |

In Table 3, "*" is indicative of a specific case in which the RACH for supporting a large-sized cell is designed, "TR" is indicative of the total length of the RACH, "TP" is indicative of a preamble length, "TG" is indicative of the length of a guard time, and "RPF" is a repetition factor of the preamble.

In more detail, the first row of the Table 3 is indicative of the RACH for the low-speed UE (RACH Type 1). As shown in the RACH 201 of FIG. 2, the RACH for the low-speed UE has the length of 1 ms without repetition of the preamble. The first row of the Table 3 also indicates the RACH for the high-speed UE (RACH Type 2), this RACH for the high-speed UE has a repetition structure in which the preamble is repeated two times as shown in the RACH 302 of FIG. 7, and the RACH for the high-speed UE has the length of 1 ms.

The second row of the Table 3 indicates that the RACH 302 of FIG. 7 is set to the RACH for the low-speed UE (RACH Type 1), and the RACH 303 of FIG. 7 is set to the RACH for the high-speed UE (RACH Type 2), so that the structure according to the second row of the Table 3 can support the large-sized cell.

In addition, the last column of the Table 3 indicates that the RACH 201 of FIG. 2 is set to the low-speed UE's RACH (RACH Type 1) and the RACH 303 of FIG. 7 is set to the high-speed UE's RACH (RACH Type 2).

According to the above embodiment of FIG. 22, under the condition that the high-speed user has no problem in accessing the Node-B using the high-speed UE's RACH (RAC Type 2), the RACH for the high-speed UE may have a short length, or may have another structure which has the same length as the other RACH of the low-speed UE simultaneously while having the preamble repetition structure. However, the RACH structure is not limited to any one of the above-mentioned examples, and can also be applied to other examples.

According to the embodiment of the present invention, the RACH (Type 2) for the high-speed UE is defined in the form of a specific construction so that the high-speed user can access the Node-B without any problem. If the RACH is implemented within the system, the system determines the presence or absence of the high-speed UE under the environment within the cell, and may properly combine the first RACH structure to be used under the environment having the frequency offset with the second RACH structure to be used under the other environment having no frequency offset, so that it may acquire the combination of the two RACH structures. In other words, two RACH structures may exist in a single Node-B, or the Node-B may selectively provide only one of the two RACH structure as necessary.

In other words, the number of arrangement of each RACH structure in a RACH resource region may be set to a predetermined rate according to frequency offset conditions within the cell. Therefore, if the number of high-speed UEs is low, the number of RACH established in the high-speed UE's RACH may be low as shown in FIG. 22. In more detail, as shown in FIG. 22, the RACH (Type 2) for the high-speed UE has a long period denoted by "RACH Type 2 Period", and the RACH (Type 1) for the low-speed UE has a short period denoted by "RACH Type 1 Period".

The high-speed UE must use only the RACH (Type 2) for the high-speed UE from among the two RACH structures, whereas the low-speed UE can use all of the two RACH structures shown in FIG. 22. The available sequences are limited in the high-speed UE's RACH, and a detailed description thereof will hereinafter be described.

In the case of considering the above-mentioned operations, the system can support the high-speed UE without reducing the number of available sequences of the low-speed UE, because most UEs are used as the low-speed UEs. Also, the system according to the present invention prevents the preamble of the low-speed UE from being repeated, so that it can prevent the RACH length from being increased. Namely, the amount of RACH overheads may be decreased.

If the high-speed UE's RACH (Type 2) and the low-speed UE's RACH (Type 1) are defined as shown in FIG. 22, the system determines whether the UE can estimate its own speed during the initial cell searching step, so that a variety of RACH access methods can be used according to the determined result.

If the UE can determine whether the UE itself is a high-speed UE or a low-speed UE in the initial cell searching step, the UE receives setup condition information of the high-speed UE's RACH and the low-speed UE's RACH, so that the UE can access the RACH corresponding to the UE speed using the received setup condition information.

However, the UE may not recognize its own speed by itself. In this case, the embodiment of the present invention determines the UE's initial RACH access or the UE's access failure, and determines whether the UE reattempts to access the RACH due to the access failure caused by the frequency offset influence. So, the above-mentioned embodiment provides a method for applying different selection probabilities to the RACH setup conditions.

Figure 23:
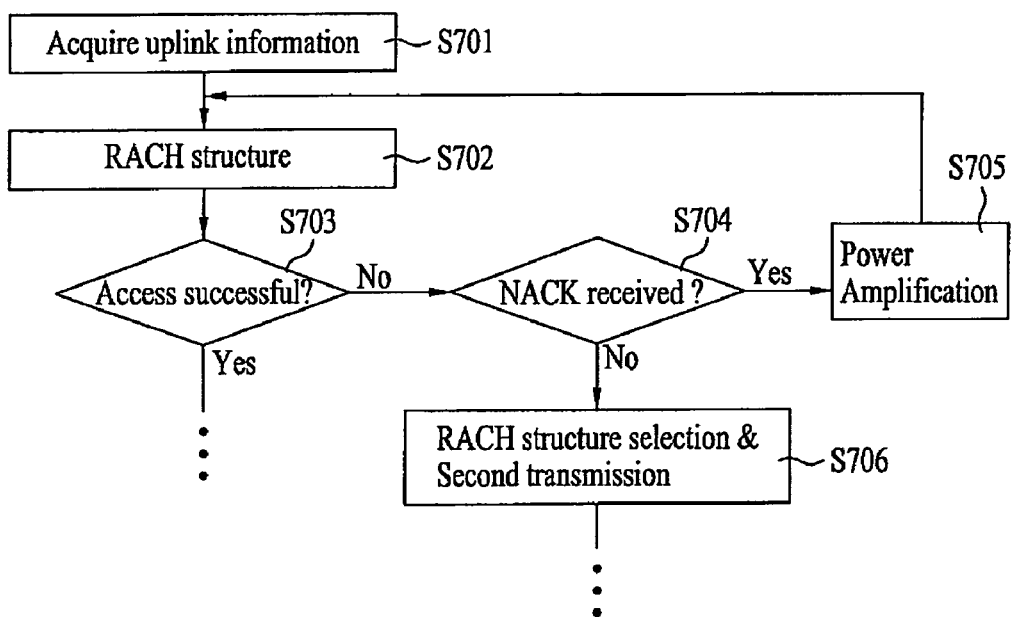
FIG. 23 is a flow chart illustrating a method for accessing the RACH when the UE is unable to estimate its speed according to one embodiment of the present invention.

FIG. 23 is a flow chart illustrating a method for accessing the RACH when the UE is unable to estimate its speed according to one embodiment of the present invention.

Referring to FIG. 23, if the UE cannot estimate its own speed, the UE acquires uplink information including both the RACH setup condition for the high-speed UE and the RACH setup condition for the low-speed UE at step S701. If the UE transmits the initial RACH, it selects the high-speed UE's RACH and the low-speed UE's RACH according to an arbitrary probability without any restrictions, so that the initial RACH transmission is conducted at step S702. For the convenience of description, this initial RACH transmission is called a first transmission.

In more detail, the two RACH types (i.e., the high-speed UE's RACH and the low-speed UE's RACH) are selected according to the same probability at step S702. In the case of the RACH access based on the first transmission, the UE may reduce the probability of selecting the high-speed UE's RACH structure so as to reduce the collision probability associated with the UE, or the low-speed UE's RACH structure is selected/established, so that the first transmission is conducted.

Therefore, the UE determines the success or failure of the RACH access at step S703. If the RACH access is successful because the UE receives an acquisition indicator (AI) or similar confirmation signal, the UE conducts a communication procedure required for the RACH access purposes.

If the failure of RACH access is decided, the UE determines whether the RACH access failure is caused (that is, acknowledged) by a NACK signal received from the Node-B at step S704. If the RACH access failure is not caused by the NACK reception at step S704, i.e., if the RACH access failure is caused by no response of the Node-B, the UE goes to step S706 so that it selects a RACH structure for retransmission and retransmits the RACH.

In this case, in order to select the RACH structure, the following two methods can be selectively used. According to the first method of the two methods, the high-speed UE's RACH and the low-speed UE's RACH are selected according to the same probability. According to the second method, the probability of selecting the high-speed UE's RACH structure may be further increased. However, if the RACH access failure occurs due to no response of the Node-B, this failure may be encountered by the frequency offset, so that it is preferable that the probability of selecting the high-speed UE's RACH structure may increase to select the RACH structure during the retransmission.

If the RACH access failure is caused by the NACK signal received from the Node-B at step S704, the UE has difficulty in deciding that the RACH access failure is caused by the frequency offset. The power boosting process is conducted at step S705, and the UE goes to step S702, so that the UE selects the RACH structure using the same probability as the first transmission, and transmits the selected RACH structure.

In the meantime, according to another embodiment, the present invention provides a method for establishing the high-speed UE's condition and the low-speed UE's condition in different ways. Specifically, this embodiment provides a method for adjusting a sequence having no problem when the high-speed UE gains access to the RACH and the other sequence available by a general low-speed UE, and then establishing the high-speed UE's condition and the low-speed UE's condition. A detailed description of the method will hereinafter be described in detail.

The RACH access under the same environment may have different results according to the sequence categories used for the RACH preamble. In other words, some sequences are very resistant to the frequency offset, but the other sequences may be very vulnerable to the frequency offset.

Figure 24:
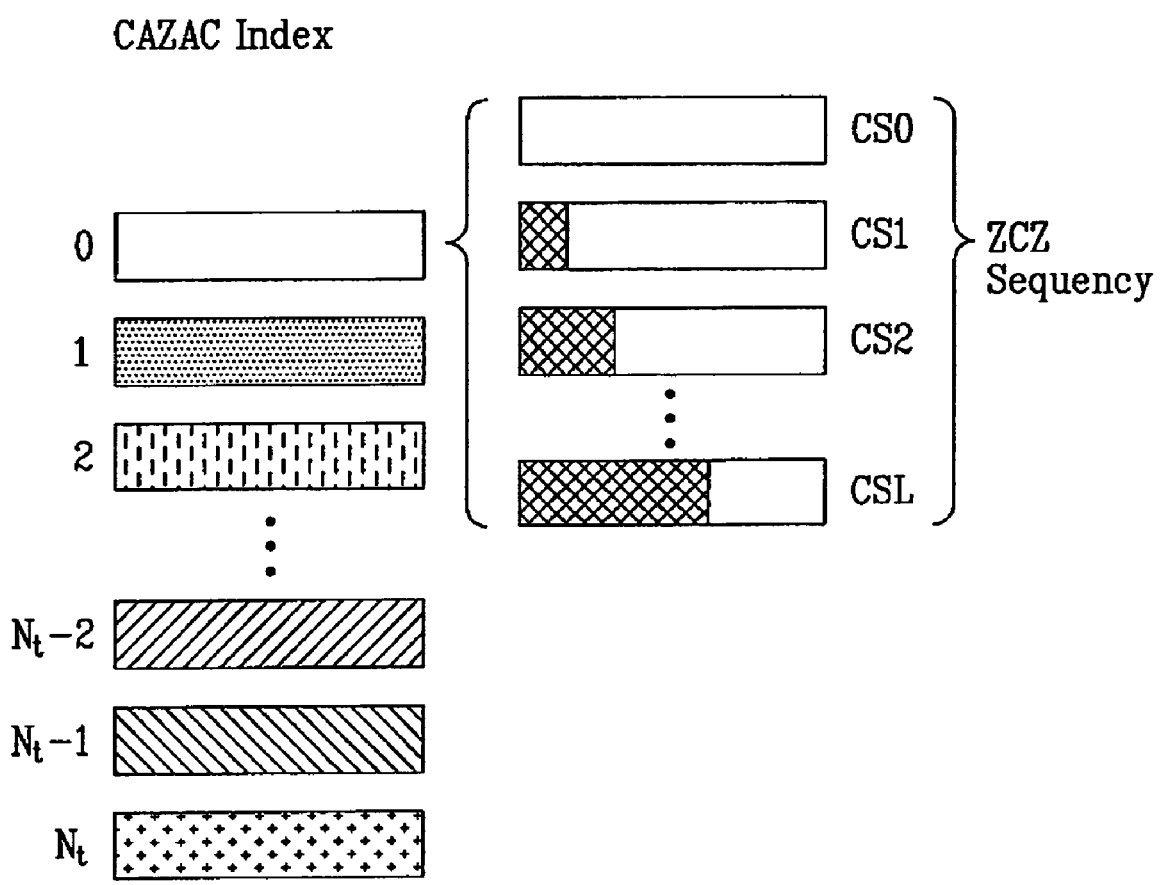
FIG. 24 is a conceptual diagram illustrating a method for employing the CAZAC sequence to differently establish a high-speed UE's RACH sequence and a low-speed UE's RACH sequence according to one embodiment of the present invention.

FIG. 24 is a conceptual diagram illustrating a method for employing the CAZAC sequence to differently establish a high-speed UE's RACH sequence and a low-speed UE's RACH sequence according to one embodiment of the present invention.

The CAZAC sequence is generally classified into the GCL CAZAC sequence and the Zadoff-Chu CAZAC sequence. The GCL CAZAC sequence and the Zadoff-Chu CAZAC sequence have complex conjugates with each other. The GCL CAZAC sequence may be acquired by a complex conjugate of the Zadoff-Chu CAZAC sequence. The Zadoff-Chu CAZAC sequence can be represented by the following equations 1 and 2:

$$c(k; N, M) = \exp\left(\frac{j\pi Mk(k+1)}{N}\right) \quad \text{[Equation 1]}$$

$$c(k; N, M) = \exp\left(\frac{j\pi Mk^2}{N}\right) \quad \text{[Equation 2]}$$

In Equations 1 and 2, "k" is indicative of a frequency-axis index, "N" is indicative of the length of the CAZAC sequence to be generated, and "M" is indicative of a CAZAC index.

The CAZAC sequence is a representative sequence which has been intensively discussed in the 3GPP LTE. The CAZAC sequence can be generally used by the following methods. A first method changes a root index of the sequence to another, and then uses the resultant sequence. A second method performs the circular shift (CS) on the sequence corresponding to a single root index, and then uses the resultant sequences.

There are two methods for applying the circular shift (CS) to the CAZAC sequence, i.e., a first method for performing the circular shift (CS) on the sequence, and a second method for multiplying an exponential function of another area by a time-area sequence or a frequency-area sequence, and then performing the circular shift (CS) on the multiplied result.

The circular shift (CS) method of the sequence can be represented by the following equation 3:

$$c(k;d,M,N)=c(\mod(k-d,N);M,N) \quad \text{[Equation 3]}$$

In Equation, "d" is indicative of an amount of the circular shift (CS), and "mod" is indicative of a modulo-operator.

The method for multiplying the sequence by an exponential function, and applying the circular shift (CS) to the resultant sequence can be represented by the following equation 4:

$$c(k; d, M, N) = f(\mod(k-d, N); M, N) \quad \text{[Equation 4]}$$
$$= \exp\left(\frac{j2\pi dk}{N}\right) FFT(c(k; d, M, N))$$

The CAZAC sequence has a little cross-correlation value under different root indexes, but this cross-correlation does not affect the design of the sequence usage.

However, if the circular shift (CS) is applied to the CAZAC sequences, a cross-correlation value among the resultant CAZAC sequences is zero, so that these CAZAC sequences are used when the high rejection ratio is needed. Specifically, the above CS-processed CAZAC sequences share the same time-frequency resources within the same cell, so that they are used to discriminate among different signals and different UEs during the transmission of data/control signals.

However, if the frequency offset occurs on the frequency axis in the same manner as in the OFDM-based transmission, the throughput deterioration may greatly occur.

Referring to FIG. 24, each of Nt CAZAC indexes (i.e., Nt number of CAZAC indexes) includes L number of ZCZ (Zero Correlation Zone) sequences (hereinafter referred to as L ZCZ sequences) having different circular shifts. In this case, the ZCZ is indicative of a specific interval to which the CS is applied so that the Node-B can discriminate among the RACH signals.

If the CAZAC sequence is used as a RACH preamble sequence when the frequency offset exists, ZCZ sequences cannot be distinguished from each other due to the frequency offset. Therefore, the present invention provides a method for disusing the ZCZ sequence as the high-speed UE's RACH sequence.

However, if the high-speed UE disuses the ZCZ sequence, the system can use only Nt indexes based on the CAZAC indexes, so that the number of available sequences is decreased. If the sequence reuse factor is decreased, the system must allocate the sequence according to the cell-planning.

As described above, if the ZCZ sequences cannot be distinguished from each other due to the frequency offset, this problem becomes serious if the CAZAC index is not very high or low. In more detail, provided that "k" is indicative of a frequency-axis index, "N" is indicative of a CAZAC sequence, "M" is indicative of a CAZAC index, and a transmission (Tx) signal is c(k,N,M), the reception (Rx) signal R(k,N,M) can be represented by the following equation 5:

$$R(k, N, M) = c(K, N, M) \cdot \exp\left(-\frac{2\pi M \cdot d}{N} \cdot k\right) \quad \text{[Equation 5]}$$

In Equation 5, "d" is indicative of a frequency-axis delay caused by the frequency offset.

As can be seen from Equation 5, if the CAZAC index "M" has a very low value or the highest value from among Nt sequence indexes, it can be recognized that the frequency offset influence is decreased in the Rx signal.

The above-mentioned result can also be recognized by other conditions. For example, as can be seen from FIGS. 3 to 6, if the CAZAC index is very high or low, the detection throughput becomes much higher and the false alarm rate becomes much lower, so that the above-mentioned result can be easily confirmed.

Therefore, if the ZCZ CAZAC sequence is used as the preamble sequence for the high-speed UE, the present invention according to another embodiment provides a method for employing a sequence in which a CAZAC index is within an initial predetermined range or within the last predetermined range of overall indexes. In this case, the predetermined range may be differently established according to the detection throughputs of the system.

The above-mentioned method increases the number of available sequence categories as compared to the method for disusing the ZCZ sequence for the high-speed UE, so that the cell-planning is almost no longer required.

In more detail, if the number of total CAZAC indexes used as the high-speed UE sequence increases up to Nt as shown in FIG. 24, the system is able to use several CAZAC indexes (0, 1, 2, Nt−2, Nt−1, and Nt). The CAZAC indexes less affected by the frequency offset can be commonly used by all the cells, and the above-mentioned CAZAC indexes for the high-speed UE can be established in all the cells, so that high-speed users can commonly use the above-mentioned CAZAC indexes. In this case, although an unexpected interference may occur between neighboring cells, the UE receives only a response from its associated cell, so that there is no problem in operation.

In the meantime, in the case of the CAZAC sequence for the low-speed UE, the system selects an arbitrary index irrespective of the index size, and uses the selected index. In order to further reduce the collision probability between the low-speed UE and the high-speed UE, it is preferable that the low-speed UE may not use the sequence index allocated for the high-speed UE.

For the high-speed UE, the system may perform the cell-planning for only the CAZAC of high-speed available indexes, instead of using the other CAZAC index commonly used by total cells. However, the above-mentioned operation unavoidably increases the sequence reuse factor, so that it conflicts with the concept of the present invention which aims to prevent the cell-planning from being generated. Therefore, according to this embodiment, the present invention may perform the following operations to minimize the sequence reuse factor and the cell-planning.

In other words, in the case where the sequence is allocated to the high-speed UE and the low-speed UE, the present invention considers the sequence reuse factor, and may limit a sequence distribution rate to some of the total sequences supported by the Node-B.

For example, if the number of total sequences supported by the Node-B is 64, the combination of sequences is represented by a predetermined format "(Sequence vulnerable to the frequency offset (i.e., low-speed UE's sequence), Sequence resistant to the frequency offset (i.e., high-speed UE's sequence))". For example, the combination of sequences may be represented by (60,4), (56,8), (48,16), and (32,32), etc. If the sequence resistant to the frequency offset uses the ZCZ sequence, the number of available sequences is very low, so that the system allocates a small number of ZCZ sequences to prevent the cell-planning from being generated. However, in order to allow the system to use many more ZCZ sequences, the combination (32,32) is decided, so that the cell-planning is conducted within the total number of sequences resistant to the frequency offset.

If the sequence disusing the ZCZ sequence is allocated to the high-speed UE's sequence resistant to the frequency offset, the system must consider the total sequence reuse factor. In other words, if many more sequences are allocated to the second item of the above-mentioned example, the total sequence reuse factor is decreased, resulting in the occurrence of serious problems.

Although the sequence allocation has been conducted according to the two cases (i.e., a first case in which the high-speed UE uses the ZCZ sequence and a second case in which the high-speed UE disuses the ZCZ sequence), the distinction of the two cases is considered to be meaningless by the Node-B. Namely, the Node-B determines only whether a specific sequence is detected or not, and generates a response according to the determined result.

In the meantime, if the high-speed UE's sequence and the low-speed UE's sequence are allocated as described above, a method for allowing the high-speed UE and the low-speed UE to access the RACH is as follows.

If each UE can estimate its own speed during the initial cell searching step, it may access the RACH via a RACH sequence corresponding to its own speed. However, it should be noted that the UE may not have information associated with its speed. In this case, although the system has conducted the sequence allocation as described above, it may not use the allocated sequence. Therefore, according to the method for establishing the high-speed UE's RACH structure and the low-speed UE's RACH structure in different ways, each UE may access the RACH using the processes similar to those of FIG. 23.

In more detail, the UE establishes downlink synchronization, and collects uplink information including the RACH sequence allocation information. Thereafter, the UE selects the high-speed UE's sequence and the low-speed UE's sequence according to a predetermined probability during the initial access, and may apply the selected sequences to the preamble using the following schemes.

According to the first scheme, the UE selects all the available sequences according to the same probability.

According to the second scheme, if the UE uses the ZCZ sequence as the high-speed UE's sequence to reduce the collision probability between the aforementioned UE and the re-access UE, the high-speed UE's sequence is commonly used by all the cells, so that the interference between cells must be decreased. In order to decrease the interference between the cells, the probability of selecting the low-speed UE's sequence is determined to be higher than that of the high-speed UE's sequence.

According to the third scheme, due to the above-mentioned reasons, the UE is designed to access the RACH via the low-speed UE's sequence during the initial access.

Upon receiving the AI signal (or another signal equivalent to the AI signal) from the Node-B during the initial access, the next communication procedure may be conducted according to the RACH access reasons. However, if the NACK signal is received from the Node-B or no response is received from the Node-B, the following re-access process is conducted.

If the re-access is conducted due to no response of the Node-B, the system selects a sequence set for implementing the re-access. In this case, differently from the probability of selecting the high-speed UE's sequence-set and the low-speed UE's sequence-set during the initial access, it is preferable that the probability of selecting the high-speed UE's sequence-set may further increase.

In other words, the following three methods can be made available during the re-access operation.

According to the first method, the probability of selecting the high-speed UE's sequence-set and the probability of selecting the low-speed UE's sequence-set are selected by the same selection probability.

According to the second method, the probability of selecting the high-speed UE's sequence-set is higher than that of the low-speed UE's sequence-set.

According to the third method, only the high-speed UE's sequence-set is selected.

However, according to the above-mentioned first method, although the RACH re-access is conducted due to no response of the Node-B, it is preferable that the first method may be conducted under the condition that the access failure is not encountered by the frequency offset.

In the meantime, if the RACH access failure occurs due to the NACK signal received from the Node-B, the probability of selecting the high-speed UE's sequence-set is equal to the probability of selecting the low-speed UE's sequence-set during the re-access operation, and then the signal transmission is conducted.

In this case, the higher the number of no-detection times caused by no response of the Node-B, the higher the probability of selecting the high-speed UE's sequence-set.

As described above, if no response is received from the Node-B (i.e., no RACH preamble is detected), the sequence type selected by the UE during the RACH re-access is changed to another sequence type. The sequence selection probability at which the high-speed UE can be easily detected increases without using a measurement value of the UE speed, so that the deterioration caused by the speed-associated frequency offset is decreased.

There are a variety of methods for changing the above probability. For example, there are a first method in which the selection probability is not in use during the initial process, but is always selected during the re-trial process, and a second method in which the probability is selected during the initial process and is gradually changed for each retrial action.

Next, in association with the method for establishing the high-speed UE's RACH condition and the low-speed UE's RACH condition in different ways, the embodiment of the present invention provides a method for allocating different conditions to preambles of the high-speed UE and the low-speed UE which have the same RACH structure. A detailed description thereof will hereinafter be described.

The above-mentioned embodiments of the present invention have defined only one sequence capable of being applied to a single RACH structure. However, the above-mentioned embodiments are not limited to only the above-mentioned example, and may define a variety of preamble patterns in the single RACH structure as necessary. For example, the preamble having a repetition structure and the other preamble having no repetition structure can be simultaneously defined by the above-mentioned embodiments If the preamble structure is repeated, a short preamble is used so that this short preamble is repeated several times (e.g., two times). Otherwise, if the preamble structure is not repeated, the short preamble may be used without any change, or a long preamble having the length equal to the length of a preamble having repeated short preambles is defined by the above-mentioned embodiments.

The present invention may also use a variety of combinations as necessary. For example, the present invention may use a short preamble in which the preamble is repeated two times, and may also use a long preamble in which the preamble is not repeated, and a detailed description thereof will hereinafter be described.

The twice-repeated preamble has a good throughput even if the frequency offset exists, however, the number of actually-available sequences is very low. The long preamble has many sequences, however, it is vulnerable to the frequency offset.

Provided that the UE has recognized its own speed, it properly selects the short preamble or the long preamble, and transmits the selected preamble.

However, indeed, the UE may not recognize its own speed in some cases. In this case, the UE cannot determine which one of preambles should be selected, so that it selects an arbitrary preamble during the initial RACH transmission, or selects a specific preamble according to the UE's current CQ information during the initial RACH transmission. If the signal should be retransmitted due to no response of the Node-B, the UE may properly select any one of the short preamble and the long preamble.

In this case, the reference of the above preamble selection is as follows. Under the condition that the long preamble is made by repetition of the short preamble, if the short preamble is selected during the retransmission, this means that the UE CQ is very good or the UE speed is very slow. If the long preamble is selected during the retransmission, this means that the CQ is poor or the UE speed is very fast.

Otherwise, under the condition that the long preamble is not created by repetition of the short preamble and is created by a single long sequence, the selection results are contrary to the above-mentioned results. In other words, if the short preamble is selected during the retransmission, this means that the CQ is poor or the UE speed is very fast. If the long preamble is selected during the retransmission, this means that the UE CQ is very good or the UE speed is very slow.

Needless to say, the selection probabilities of the short preamble and the long preamble are established as shown in FIG. 15, and the signal transmission is conducted according to the uniform- or long-preamble format during the initial process. If the Node-B does not detect the transmission (TX) signal, the present invention may also increase the probability of selecting the short preamble, as well known in the art.

The above-mentioned embodiment has disclosed a method for differently establishing the RACH sequence by determining whether the UE speed is high or low. However, it should be noted that individual cells for use in the cellular mobile communication system have different frequency offset degrees as necessary.

Therefore, the present invention provides a method for allocating different sequences according to the frequency offset degrees of the individual cells, and a detailed description thereof will hereinafter be described.

Figure 25:
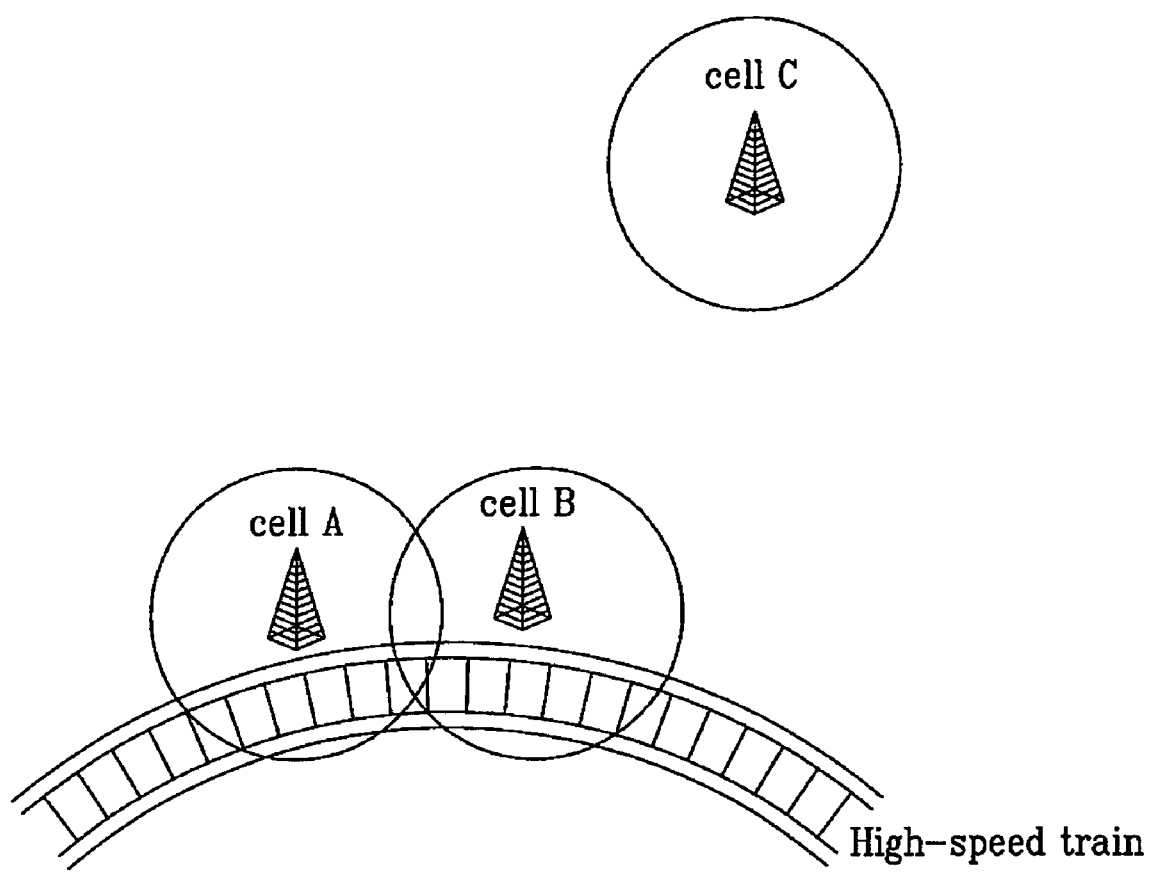
FIG. 25 is a conceptual diagram illustrating different offset situations of several cells according to the present invention.

FIG. 25 is a conceptual diagram illustrating different offset situations of several cells according to the present invention.

In a cellular mobile communication system including a plurality of cells, if a specific cell has many UEs, each of which moves at high speed, this means that the frequency offset degree is very high. The UE existing in the cell having any residential district area may be a low-speed UE as a rule, so that it is determined that the frequency offset degree within the cell is not high.

In more detail, FIG. 25 shows the cells A and B adjacent to the high-speed train, and the cell C distant from the high-speed train.

The cells A and B adjacent to the high-speed train may probably include several high-speed UEs, so that it is preferable that the sequence resistant to the frequency offset may be allocated to the cells A and B during the sequence allocation.

The cell C distant from the high-speed train might not have the high-speed UE as a rule, so that there is no need to allocate only the sequence resistant to the frequency offset to the cell C.

As described above, if the frequency offset situation for each cell is decided, and a cell affected by the frequency offset has the CAZAC sequence, the system may have difficulty in discriminating between ZCZ sequences due to the frequency offset.

Therefore, the present invention provides a method for disusing the ZCZ sequence as a sequence to be used in a predetermined cell having a frequency offset higher than a reference level. In this way, a threshold value is used to decide the frequency offset degree of each cell. This threshold value may be properly determined according to frequency offset degrees of the individual cells of available sequences of the system.

Provided that a frequency offset higher than a predetermined level is pre-allocated to a specific cell, the probability of the high-speed UE existing in this specific cell is very high as in the cell A or B.

If the ZCZ sequence is not used in the above-mentioned cell having the frequency offset higher than the predetermined level, the system can use only Nt indexes based on the CAZAC indexes, so that the number of available sequences becomes lower. So, if the sequence reuse factor becomes lower, the system must perform the sequence allocation according to the cell-planning process. However, this cell-planning has a disadvantage in that it unavoidably increases the complexity when the sequence is allocated to each cell. As a result, if the number of available sequences is decreased as described above, another solution for solving this deficiency of available sequences is needed.

Therefore, if the cell has the frequency offset which is equal to or higher than a predetermined level, the present invention may allocate only the root sequence to this cell during the CAZAC-sequence allocation. If the number of available sequences is still low although the root sequence has been allocated to the above cell, so that the system must use the ZCZ CAZAC sequence, the present invention enables the CAZAC index within the initial predetermined range or within the last predetermined range from among the total indexes. In this case, the predetermined range may be established in different ways according to the detection throughputs of the system.

According to the above-mentioned embodiment, the number of available-sequence categories is higher than that of the other method for disusing the ZCZ sequence in the cell of the high frequency offset, so that the cell-planning is almost no longer required.

In more detail, if the number of total CAZAC indexes increases up to Nt as shown in FIG. 24, the system is able to use several CAZAC indexes (0, 1, 2, Nt−2, Nt−1, and Nt) as sequences to be used in the cell having the high frequency offset In the case of using the CAZAC sequence for the cell having a frequency offset less than a predetermined level, there is no need for the above CAZAC sequence to use only the remaining indexes other than the above indexes (0, 1, 2, Nt−2, Nt−1, and Nt), and the above CAZAC sequence may selectively use an arbitrary index. In order to reduce the interference between the above cell having a low frequency offset and the other cell having a high frequency offset, the sequence index for the cell having the high frequency offset might not be used by the system as necessary.

According to still another embodiment, the present invention provides a method for allowing the UE to predict the occurrence of a Node-B's false alarm caused by the frequency offset and then allowing the UE to interpret the AI value received from the Node-B, and a detailed description thereof will hereinafter be described.

Figure 26:
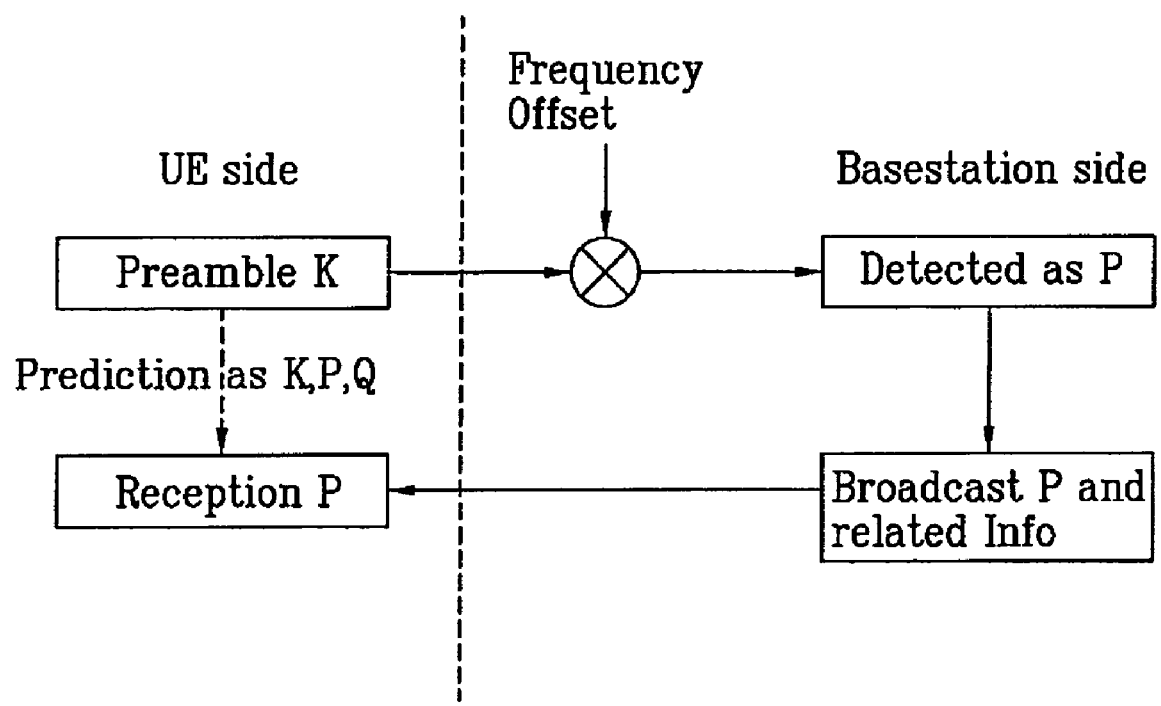
FIG. 26 is a conceptual diagram illustrating a method for allowing the user equipment (UE) to estimate a false alarm of the Node-B so that the user equipment (UE) can perform random access according to the present invention.

FIG. 26 is a conceptual diagram illustrating a method for allowing the UE to estimate a false alarm of the Node-B so that the UE can perform random access according to the present invention.

Referring to FIG. 26, if the UE approximately recognizes its own speed, the UE can estimate the error caused by the RACH preamble transmitted from the UE itself. In other words, the UE transmits a specific sequence K, so that it can estimate that this sequence K may be wrongly detected as another sequence P by the Node-B due to the influence of the frequency offset. Therefore, the Node-B applies the same process as the conventional method to the detected sequence without specifically correcting the RACH, however, the UE pre-recognizes that its Tx sequence will be wrongly detected as another sequence. So, if the response of the Node-B is received in a corresponding sequence, the UE decides that the corresponding sequence belongs to the UE itself, and then processes this sequence.

In this case, from the viewpoint of the Node-B, the above-mentioned operation may be considered to be the false alarm. But, from the viewpoint of the UE, the above-mentioned operation may not be considered to be the false alarm, so that the UE can be properly conducted. For this purpose, the UE must pre-recognize that its Tx sequence will be detected as another sequence by the Node-B, so that the Node-B must inform the UE of its detection algorithm in the downlink direction.

FIG. 26 exemplarily shows that the UE has estimation values of several transmittable sequences (K, P, and Q).

It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Industrial Applicability

As apparent from the above description, the present invention provides the method for establishing a strong RACH resistant to the frequency offset, and transmitting/receiving the RACH. This method can also be applied to the RACH used as a random access channel of the 3GPP LTE, but also systems (e.g., IEEE 802-based communication system) of other random access channels, each of which has the frequency offset problem.

The RACH setup method according to the present invention reduces the length of the RACH preamble even if the frequency offset exists, allows the RACH preamble to include a repeated structure (also called an iterative structure) or to use a specific sequence with less affect on the frequency offset, so that the Node-B can easily detect the RACH preamble. If different conditions are established in a high-speed UE and a low-speed UE, an amount of system overheads can be reduced as compared to another case in which an overall RACH condition has been prescribed for only the high-speed UE irrespective of the low-speed UE.

The present invention determines whether the user equipment (UE) can estimate its speed according to the aforementioned RACH setup condition, and prescribes a detailed RACH access method according to the determined result, so that it can transmit the RACH to decrease the influence of the frequency offset although the user equipment (UE) is unable to recognize its own speed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method for setting RACH (Random Access Channel) transmission of a user equipment (UE) to prepare for a frequency offset, the method comprising:
    setting a first RACH setup condition for a highspeed UE and a second RACH setup condition for a low-speed UE; and
    transmitting information about at least the first RACH setup condition or the second RACH setup condition via a downlink,
    wherein the first RACH setup condition and the second RACH setup condition include at least a first condition for RACH structures for use in each of the high-speed UE and the low-speed UE, a second condition for preamble structures applied to each of the high-speed UE and the low-speed UE in the same RACH structure, or a third condition for sequence sets for each of the high-speed UE and the low-speed UE, and
    wherein the condition for sequence sets for each of the high-speed UE and the low-speed UE is set to a set of CAZAC sequences and the sequence set for the high-speed UE is set to a Zero Correlation Zone (ZCZ) sequence set in which a CAZAC index is within an initial predetermined range or within a last predetermined range if the third condition is set.

2. The method according to claim 1, wherein:
    the sequence set for the low-speed UE is a sequence set in which the sequence set of the hiqh-speed UE is excluded from a total RACH sequence set.

3. The method according to claim 1, wherein:
    the sequence set of the low-speed UE is different from the sequence set of the high-speed UE.

4. The method according to claim 1, further comprising:
    determining, by a Node-B, a frequency offset situation within a cell; and
    setting each number of the high-speed UE's RACH and the low-speed UE's RACH in a RACH resource region.

5. A method for setting RACH (Random Access Channel) transmission of a user equipment (UE) to prepare for a frequency offset, the method comprising:
    setting a RACH setup condition for a high-speed UE and a RACH setup condition for a low-speed UE; and
    transmitting information about at least the RACH setup condition for the high-speed UE or the RACH setup condition for the low-speed UE via a downlink,
    wherein the RACH setup condition for the high-speed UE and the RACH setup condition for the low-speed UE includes at least a first condition for RACH structures for use in each of the hiqh-speed UE and the low-speed UE, a second condition for preamble structures applied to each of the high-speed UE and the low-speed UE in the same RACH structure, or a third condition for sequence set for each of the high-speed UE and the low-speed UE,
    wherein the sequence set for each of the hiqh-speed UE and the low-speed UE is set to a new CAZAC sequence and the sequence set for the high-speed UE does not include a Zero Correlation Zone (ZCZ) sequence if the third condition is set.

6. The method according to claim 5, further comprising:
    determining, by a Node-B, a frequency offset situation within a cell; and
    setting each number of the high-speed UE's RACH and the low-speed UE's RACH in a RACH resource region.

7. The method according to claim 5, wherein:
    the sequence set for the low speed UE is a sequence set in which the sequence set of the high speed UE is excluded from a total RACH sequence set.

8. The method according to claim 5, wherein:
the sequence set of the low speed UE is different from the sequence set of the high speed UE.

9. A RACH (Random Access Channel) transmission method comprising:
acquiring uplink information including at least a first RACH setup condition for a high-speed UE and a second RACH setup condition for a low-speed UE;
selecting either the first RACH setup condition for the high-speed UE or the second RACH setup condition for the low-speed UE, wherein a first selection probability applies to the first RACH setup condition and a second selection probability applies to the second RACH setup condition;
initially transmitting a RACH signal according to the selected RACH setup condition; and
re-selecting either the first or second RACH setup condition and re-transmitting the RACH signal if the initial transmission of the RACH signal fails,
wherein the first selection probability is set higher when re-selectinq the first or second RACH setup condition and the second selection probability is set lower when re-selecting the first or second RACH setup condition if the failure of the initial transmission is caused by no response.

10. The RACH transmission method according to claim 9, further comprising:
the first selection probability and the second selection probability are unchanged when re-selecting the first or second RACH setup condition if the failure is acknowledged by reception of a NACK signal.

* * * * *